(12) United States Patent  
Bennett

(10) Patent No.: US 7,835,929 B2  
(45) Date of Patent: Nov. 16, 2010

(54) METHOD AND SYSTEM FOR MANAGING A PORTFOLIO

(76) Inventor: Levitan S. Bennett, 12 Agua Sarca Rd., Placitas, NM (US) 87043

( * ) Notice: Subject to any disclaimer, the term of this patent is extended or adjusted under 35 U.S.C. 154(b) by 1984 days.

(21) Appl. No.: 10/220,134

(22) PCT Filed: Feb. 28, 2001

(86) PCT No.: PCT/US01/06788
§ 371 (c)(1),
(2), (4) Date: May 5, 2003

(87) PCT Pub. No.: WO01/65456
PCT Pub. Date: Sep. 7, 2001

(65) Prior Publication Data
US 2003/0208429 A1  Nov. 6, 2003

(51) Int. Cl.
*G06F 9/46* (2006.01)
(52) U.S. Cl. ............................................. 705/7
(58) Field of Classification Search ............... 705/7
See application file for complete search history.

(56) References Cited

U.S. PATENT DOCUMENTS

| 5,630,127 | A | 5/1997 | Moore et al. |
| 5,966,695 | A | 10/1999 | Melchione et al. |
| 6,018,722 | A | 1/2000 | Ray et al. |
| 6,873,961 | B1 * | 3/2005 | Thorpe et al. ........... 705/7 |
| 7,302,401 | B1 * | 11/2007 | Tervonen ............... 705/9 |
| 7,483,841 | B1 * | 1/2009 | Jin et al. ............... 705/7 |

OTHER PUBLICATIONS

Grinold et al "Active Portfolio Management: A Quantitative Approach for Providing Superior Returns and Controlling Risk", Dec. 2000, McGraw-Hill, pp. 1-621.*
International Search Report for PCT/US2001/006788, dated Apr. 8, 2001.

* cited by examiner

*Primary Examiner*—Romain Jeanty
(74) *Attorney, Agent, or Firm*—Henry B. Ward, III; Moore & Van Allen PLLC

(57) ABSTRACT

The present invention relates generally to a method and system for managing a portfolio. More specifically, the present invention includes a variety of means to calculate probabilistic risk/benefit measures of portfolios as well as extensive data visualization tools, several group decision-making tools, powerful optimization and tradeoff analysis tools, and customized simulations of projects and portfolios.

38 Claims, 33 Drawing Sheets

| USE | PROPERTY | CONSTRAINT | | SLACK |
|---|---|---|---|---|
| ☐ | Avg normalized response | ≥ 0 | − 0 | + 0 |
| ☐ | S.d. normalized response | ≥ 0 | − 0 | + 0 |
| ☐ | Avg response-weighted response | ≥ 0 | − 0 | + 0 |
| ☐ | Response-weighted s.d. response | ≥ 0 | − 0 | + 0 |
| ☐ | User-weighted response 1 | ≥ 0 | − 0 | + 0 |
| ☐ | User-weighted response 2 | ≥ 0 | − 0 | + 0 |
| ☐ | User-weighted response 3 | ≥ 0 | − 0 | + 0 |
| ☑ | Growth rate (Gartner) | ≥ 15 % | − 1 | + 1 |
| ☑ | Market size (Gartner) | ≥ 5 B$ | − 1 | + 1 |
| ☑ | Qualified full-time technicians and engineers | ≥ 30 % | − 5 | + 0 |
| ☐ | Market demand | ≥ 0 | − 0 | + 0 |
| ☐ | Technical capabilities | ≥ 0 | − 0 | + 0 |
| ☐ | Q1 (Marketing ability) | ≥ 0 | − 0 | + 0 |
| ☐ | Q2 (Selling ability) | ≥ 0 | − 0 | + 0 |
| ☐ | Q3 (Delivery capability) | ≥ 0 | − 0 | + 0 |
| ☐ | Q4 (Gross profit potential) | ≥ 0 | − 0 | + 0 |
| ☐ | Q5 (market need) | ≥ 0 | − 0 | + 0 |
| ☐ | Q6 (Lifeyle position) | ≥ 0 | − 0 | + 0 |
| ☐ | Q7 (Longevity) | ≥ 0 | − 0 | + 0 |
| ☐ | Q8 (Offering synergy) | ≥ 0 | − 0 | + 0 |
| ☐ | Q9 (Buyer relationships) | ≥ 0 | − 0 | + 0 |

[ Load goals ]   [ Save goals ]   [ Close ]

Fig. 4-13

| Service | Avg normalized respon | S.d. normalized respon | Growth rate (Gartner) | Market size (Gartner) | Qualified techs & engine |
|---|---|---|---|---|---|
| Asset mgt | 0.54 | 0.34 | 22.00 | 2.60 | 100.00 |
| Migration | 0.72 | 0.54 | 18.70 | 5.60 | 48.00 |
| Infrastructure | 0.62 | 0.42 | 17.80 | 17.90 | 31.00 |
| Project mgt | 0.68 | 0.49 | 18.00 | 4.50 | 22.00 |
| Help desk | 0.71 | 0.61 | 16.40 | 4.20 | 35.00 |
| Augmentation | 0.69 | 0.67 | no data | no data | 83.00 |
| Break Fix | 0.70 | 0.70 | 6.00 | 90.80 | 74.00 |
| e-Business | 0.61 | 0.25 | 23.30 | 8.50 | no data |
| Procurement | 0.70 | 0.77 | no data | no data | no data |

METHOD AND SYSTEM FOR MANAGING A PORTFOLIO

FIELD OF THE INVENTION

The present invention relates generally to a method and system for managing a portfolio. More specifically, the present invention includes a variety of means to calculate probabilistic risk/benefit measures of portfolios as well as extensive data visualization tools, several group decision-making tools, powerful optimization and tradeoff analysis tools, and customized simulations of projects and portfolios.

BACKGROUND

One of more difficult problems companies face is deciding where to allocate resources. Decisions are made when new initiatives are considered and, at least in theory, during frequent project reviews. Companies consider researching new technologies, purchasing existing technologies, acquiring small companies, mergers with competitors, line extensions to existing products, repositioning of products in the market, new advertising campaigns, and a host of other tasks. Despite wide differences in product areas, the processes whereby these many projects and initiatives are managed have much in common: evaluate the projects, assess the company's strategy and resources, and allocate these finite resources to the projects so as to maximize estimates of success, minimize estimates of risk or harm, and match the company's strategic goals.

Despite the obvious importance of project portfolio management, it is generally found difficult to do efficiently and correctly. Unlike commodity portfolio management, historical data is of limited utility in predicting the finances and success of new projects. Additionally, the start-up and stop costs of projects are much larger and less-easily quantified, there are more complex probabilistic relationships between projects, and there is much greater need and opportunity for active management of projects than for commodities. For these reasons, the vast array of tools developed for commodities management are of limited utility in project portfolio management. Existing software tends to include a variety of simplistic assumptions and very limited ability to gauge the tradeoffs between different portfolios. Therefore, companies that have seriously considered project management typically use a mixture of qualitative and quantitative project assessment techniques, graphic depictions of project and portfolio characteristics to allow visually setting a "balanced" portfolio, or rough uses of optimization methods and ranking tools. The more common case is that a company has only rough plan for managing projects, poor merging of project manager assessments with executive-level decisions, and a weak appreciation for the limitations of the software and assessment tools it does use. (For example, quantitative assessment tools often mislead managers into trusting numbers that are extremely uncertain.) In almost all cases, the existing tools evaluate projects independently and assume there is no relationship between them.

Accordingly, there is a need for a suite of modular tools that can be easily configured and mixed so as to rapidly devise customized solutions for a company. In particular, there is a need for a variety of means to calculate probabilistic risk/benefit measures of portfolios to perform data visualization tools, to perform group decision-making, to optimize, to perform tradeoff analysis, and to customize simulations of projects and portfolios.

SUMMARY OF THE INVENTION

The present invention comprises a suite of modular tools that can be easily configured and mixed so as to rapidly devise customized solutions for a company. The modules provide a variety of means to calculate probabilistic risk/benefit measures of portfolios as well as extensive data visualization tools, several group decision-making tools, powerful optimization and tradeoff analysis tools, and customized simulations of projects and portfolios. The mathematically rigorous approaches used overcome many of the simplistic assumptions and allow for extensive tradeoff analysis.

It is an aspect of a method of the present invention to interact with a computer to manage a portfolio of one or my projects comprising the steps of:
  executing an application which includes one or more windows having one or more controls;
  manipulating at least one of said controls to associate one or more plot characteristics with one or more attributes of the projects;
  manipulating at least one of said controls to display a plot of said attributes and of said projects in accordance with said plot characteristics.

It is an aspect of another method of the present invention to interact with a computer to evaluate a plurality of projects comprising the steps of:
  executing an application which includes one or more windows having one or more controls;
  manipulating, by one or more participants, at least one of the controls in at least one of the windows to input one or more acceptances or rejections of the projects;
  manipulating at least one of said controls to select one or more criteria for evaluating one or more of the projects wherein at least one of said criteria is based on said one or more acceptances or rejections; and
  manipulating at least one of said controls in at least one of said windows to display the evaluation of said projects according to said criteria.

It is an aspect of another method of the present invention to interact with a computer to manage one or more portfolios of one or more projects comprising the steps of:
  executing an application which includes at least one window having one or more controls;
  manipulating at least one of said controls to specify one or more goals for the portfolios; and
  manipulating at least one of said controls to select at least one of said projects to include in said one or more portfolios and to display values of at least one of the goals for said one or more portfolios.

BRIEF DESCRIPTION OF THE DRAWINGS

FIG. 1-2 displays a Project Palette Tool Selection Palette window after loading a session file.

FIG. 1-3 displays a Goals alignment window in Project Palette Tool just after a session file has been loaded.

FIG. 1-4 displays a Legend for bubble plots shown in Selection Palette window.

FIG. 1-5 displays a Selection palette window after six projects have been made active.

FIG. 1-6 shows a Goals alignment window after the 6 projects have been active.

FIG. 1-7 displays a Goals alignment window for a different set of goals.

FIG. 1-8 displays a Project Palette in which one of the two bubble plots has been changed to tabular form.

FIG. 1-9 displays a Portfolio detail window, showing the active projects, metric values, and goal satisfactions for the present portfolio in the Project Palette.

FIG. 1-10 displays a Bubble plot parameters window—allowing the user to specify which project attribute is associated with what bubble plot characteristic.

FIG. 1-11 displays a Pull-down menu on bubble plot parameters window, showing the various project attributes available for associating with bubble plot characteristics.

FIG. 1-12 displays a different association of project attributes with bubble plot characteristics, showing variation in bubble size with an attribute as well as a categorical variable (quarterly dates) on the x axis.

FIG. 1-13 displays a Context menu displayed when right-clicking on a bubble or element of a tabular list of projects.

FIG. 1-14 displays a Missing values parameters window.

FIG. 1-15 displays a Set goals window.

FIG. 1-16 displays a set bubble plot parameters window which uses red text to immediately alert the user that the specified attribute is missing for at least one project.

FIG. 1-17 displays a bubble plot legend that is updated to indicate that particular bubble characteristics, here color and shape, are associated with attributes missing for at least one project.

FIG. 1-18 displays a Bubble plot with missing values displayed as gray crosses.

FIG. 1-19 displays an example of the user of Project Palette for visual data mining, in which the spatial and temporal arrangements of visual elements reveal patterns and relationships in the data.

FIG. 1-20 displays a screen shot from Portfolio Sherpa, showing the Project Palette tool.

FIG. 1-21 displays a screen shot of a possible variant of the project palette tool, in which the uncertainty associated with the underlying project variables is folded into probability distributions calculated for the portfolio metrics.

FIG. 2-1 shows a User job type entry window (Rank Entry tool).

FIG. 2-2 shows a Project ranking window (Rank Entry tool).

FIG. 2-3 shows a Project ranking window after projects have been accepted and rejected (Rank Entry tool).

Figure 1:
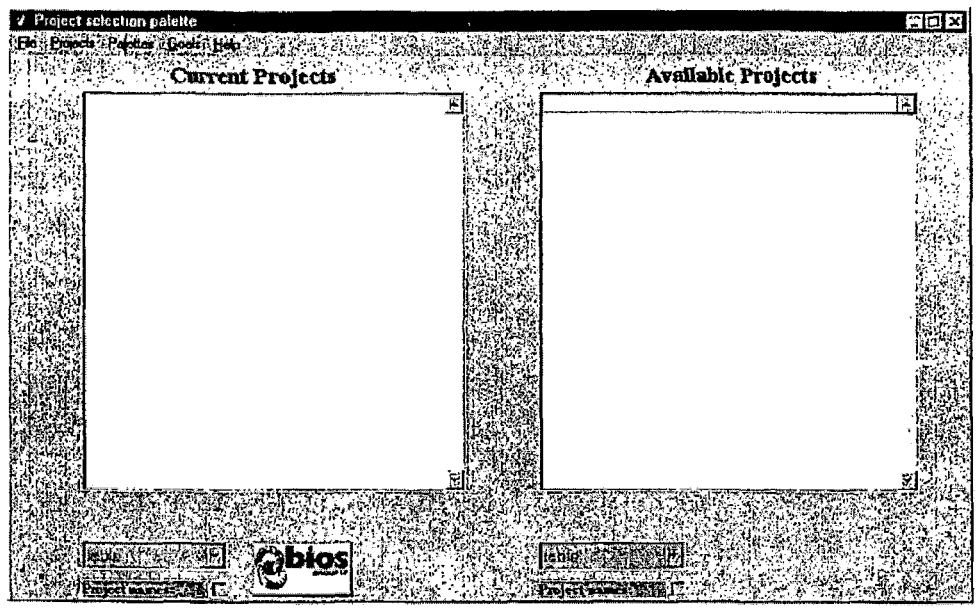
FIG. 1-1 displays the Startup screen in Project Palette Tool, which is the first window shown after the splash screen.
Figures 1, 2:
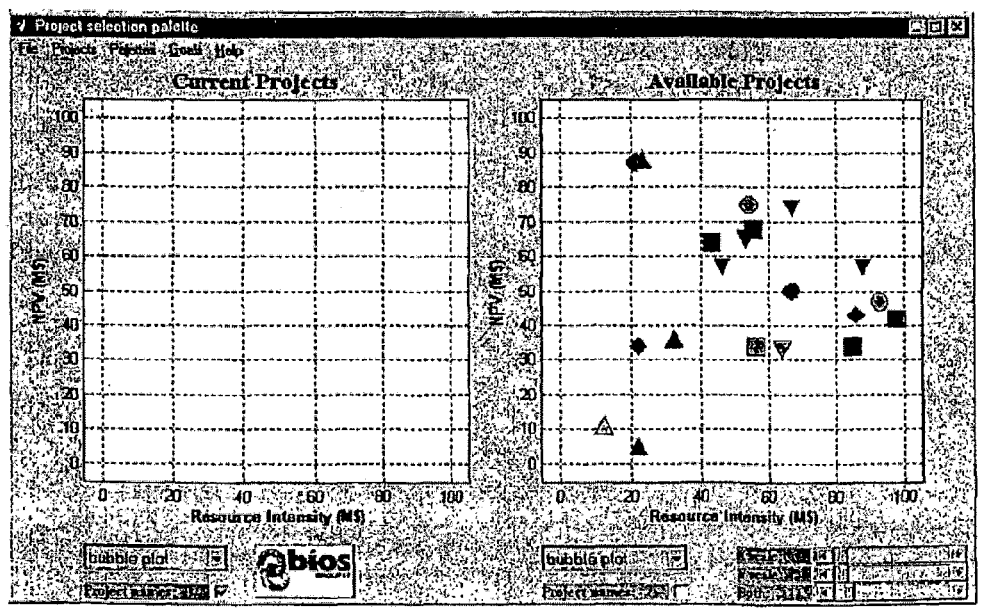
Figures 1, 2, 3:
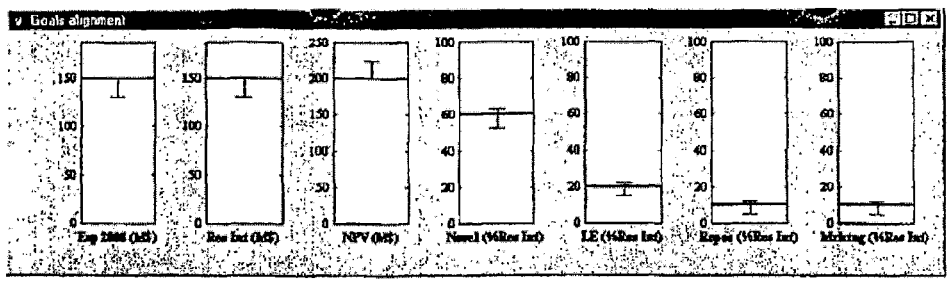
Figures 1, 2, 3, 4:
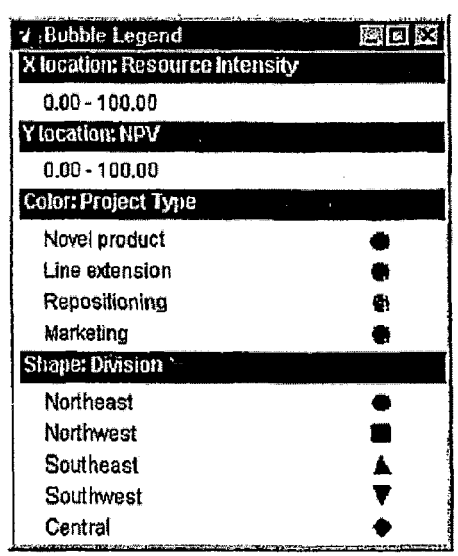

Right-clicking on a project in both components of the In 'n Out tool brings up a hierarchic menu showing the properties of the selected project as displayed in FIG. 2-4.

FIG. 2-5 shows an Initial rankings analysis window, which is displayed when starting the Rank Analysis tool.

FIG. 2-6 shows a Ranking analysis window with ranking set by net present value (NPV) and an upper threshold determined by the % acceptances.

FIG. 2-7 shows a Ranking analysis window with ranking set by % acceptance and an upper threshold set by cumulative resource intensity.

FIG. 3-1 displays an Active portfolios window that is shown upon starting the Sherpa.

FIG. 3-2 displays a Portfolio edit window.

FIG. 3-3 displays a Set goals window.

FIG. 3-4 shows one portfolio in iconic format on the active portfolios screen.

Figures 1, 2, 3, 4, 5:
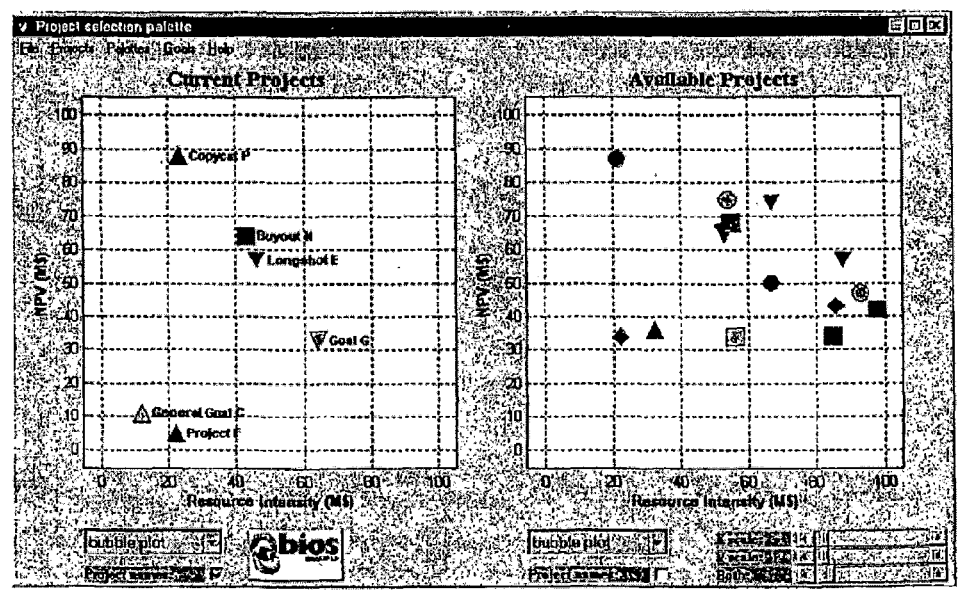

FIG. 3-5 shows a Display of portfolio details once goals have been set.

FIG. 3-6 shows an Active portfolios window once a large population of portfolios have been generated.

FIG. 3-7 shows an Active portfolios window after changing the number of icons that can be displayed.

FIG. 3-8 shows an Optimization constraints window.

FIG. 3-9 shows 2-D scatterplot controls.

FIG. 3-10 shows a 2-D scatterplot generated by the controls in FIG. 3-9.

FIG. 3-11 shows a 2-D scatterplot when the requested efficient frontier is not the same as the two axes in the plot.

FIG. 3-12 shows 2-D subset scatterplot controls.

FIG. 3-13 shows a 2-D subset scatterplot.

FIG. 3-14 shows a 2-D subset scatterplot that omits the points that do not meet the constraints.

FIG. 3-15 demonstrates the ability to zoom in on "rubberband" selected portions of a 2-D subset scatterplot.

FIG. 3-16 shows a screen shot from Portfolio Sherpa that shows an iconic representation of a pool of potential portfolios in memory, the details on one portfolio, an interface for specifying strategic goals, and a tradeoff plot between portfolio NPV and strategic alignment.

FIG. 3-17 shows assorted windows from Portfolio Sherpa.

FIG. 4-1 shows a User job type entry window.

FIG. 4-2 shows an Initial data entry screen of scorecard entry tool.

FIG. 4-3 shows a Data entry screen for scorecard entry tool after all questions have been answered for the first three projects and some questions have been answered for the fourth project.

FIG. 4-4 shows a Survey summary in scorecard analysis tool.

FIG. 4-5 shows a Response grid window in scorecard analysis tool.

Figures 1, 2, 3, 4, 5, 6:
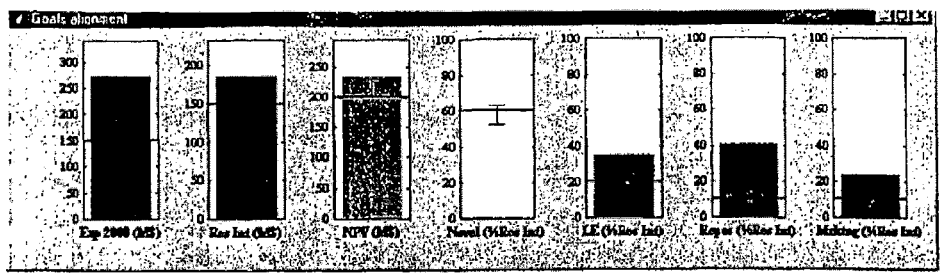
Figures 1, 2, 3, 4, 5, 6, 7:
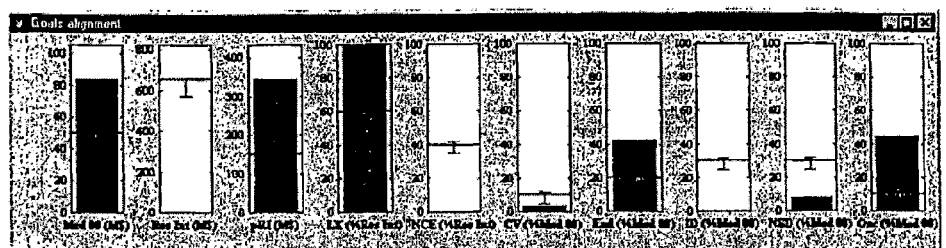
Figures 1, 2, 3, 4, 5, 6, 7, 8:
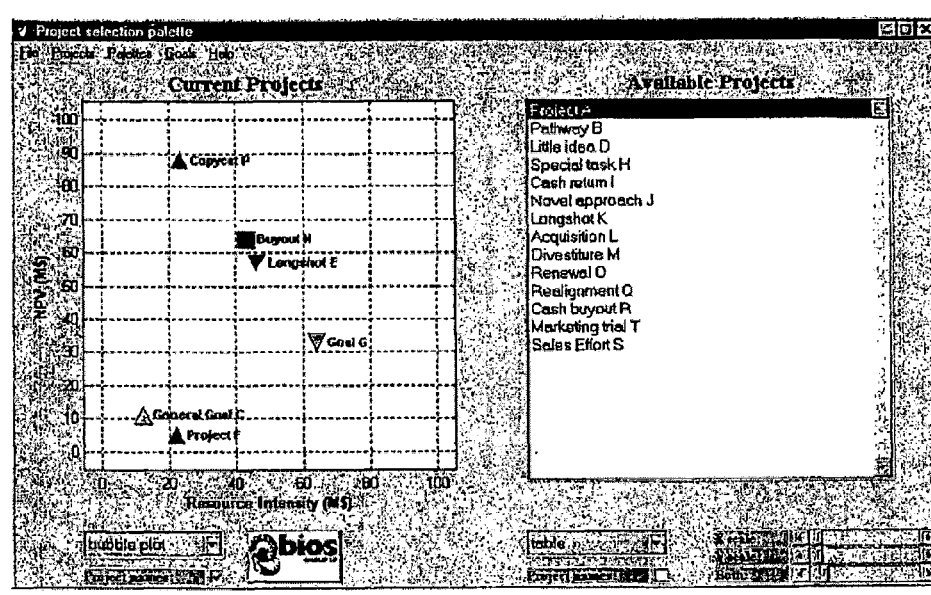
Figures 1, 2, 3, 4, 5, 6, 7, 8, 9, 10, 11, 12:
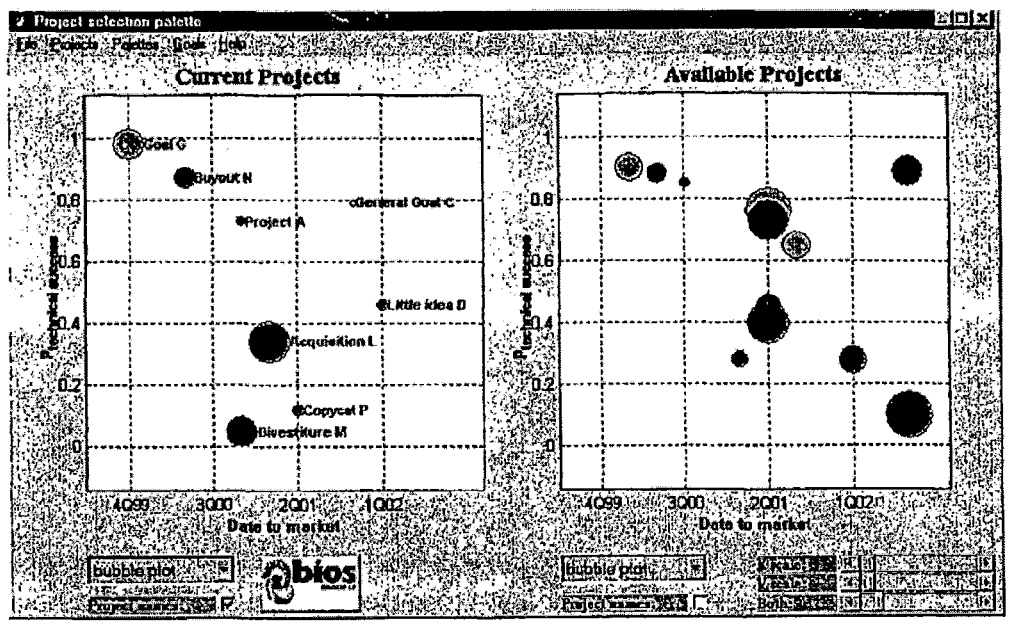
Figures 1, 2, 3, 4, 5, 6, 7, 8, 9, 10, 11, 12, 13:
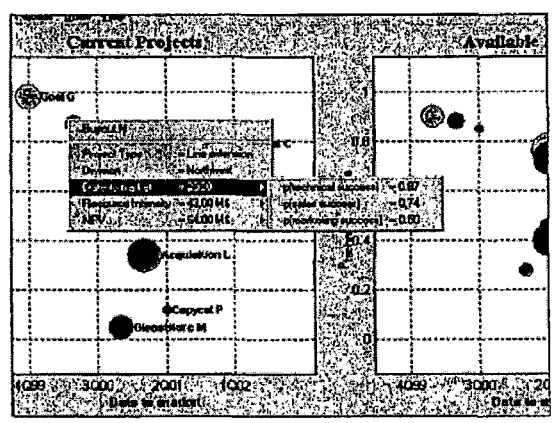
Figures 1, 2, 3, 4, 5, 6, 7, 8, 9, 10, 11, 12, 13, 14:
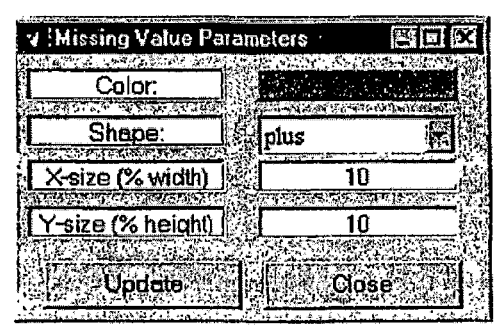
Figures 1, 2, 3, 4, 5, 6, 7, 8, 9, 10, 11, 12, 13, 14, 15:
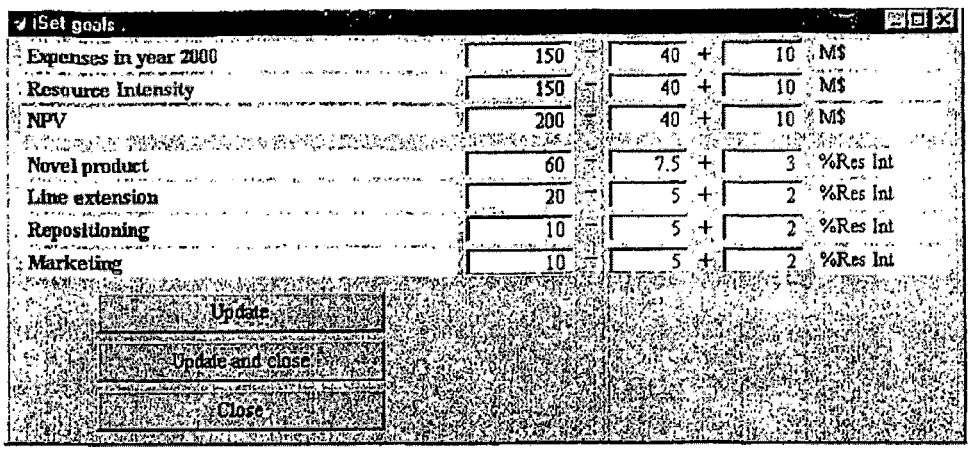
Figures 1, 2, 3, 4, 5, 6, 7, 8, 9, 10, 11, 12, 13, 14, 15, 16:
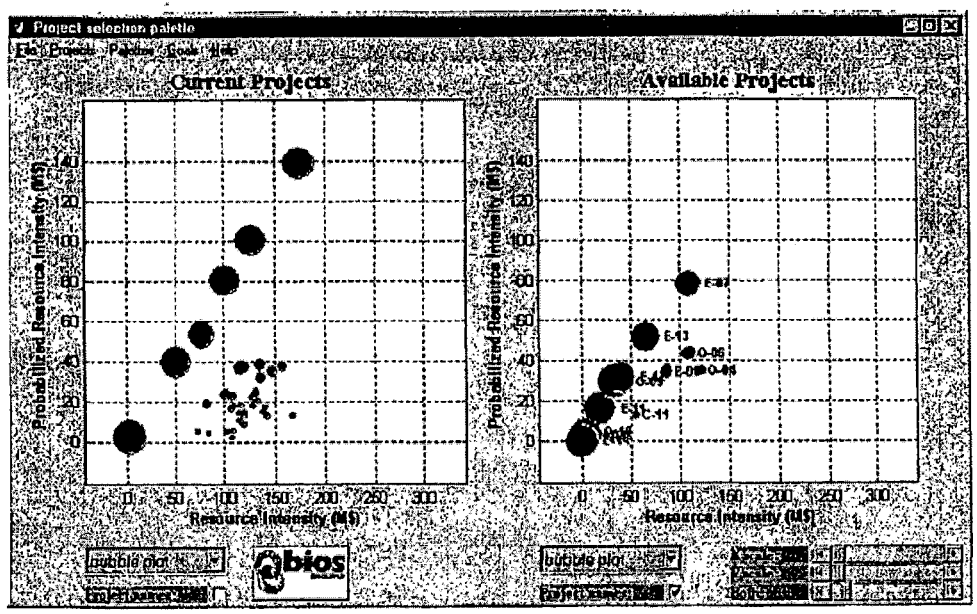
Figures 1, 2, 3, 4, 5, 6, 7, 8, 9, 10, 11, 12, 13, 14, 15, 16, 17:
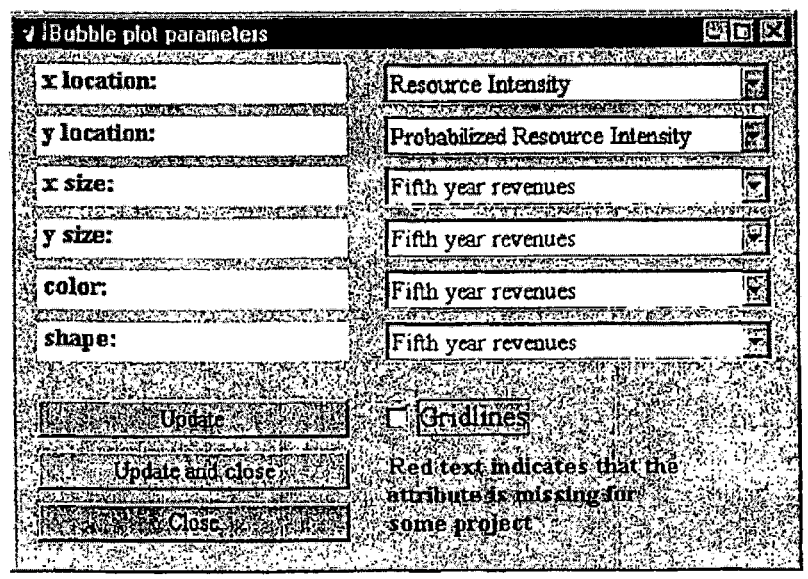
Figures 1, 2, 3, 4, 5, 6, 7, 8, 9, 10, 11, 12, 13, 14, 15, 16, 17, 18:
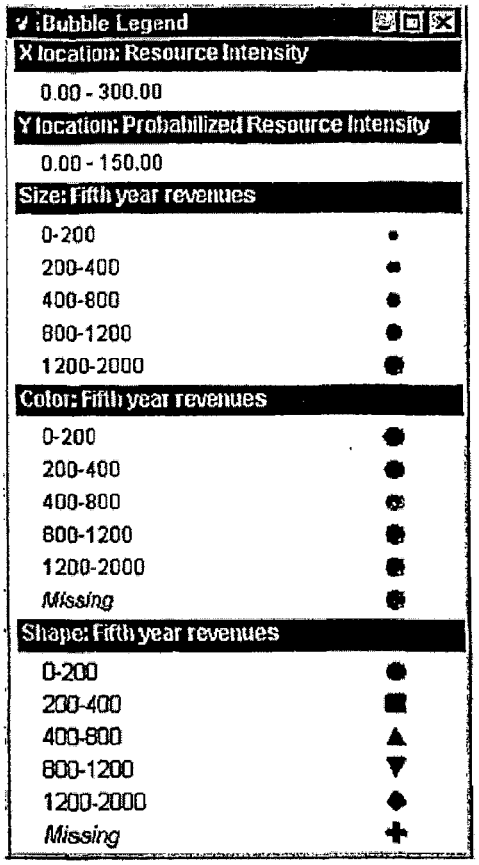
Figures 1, 2, 3, 4, 5, 6, 7, 8, 9, 10, 11, 12, 13, 14, 15, 16, 17, 18, 19:
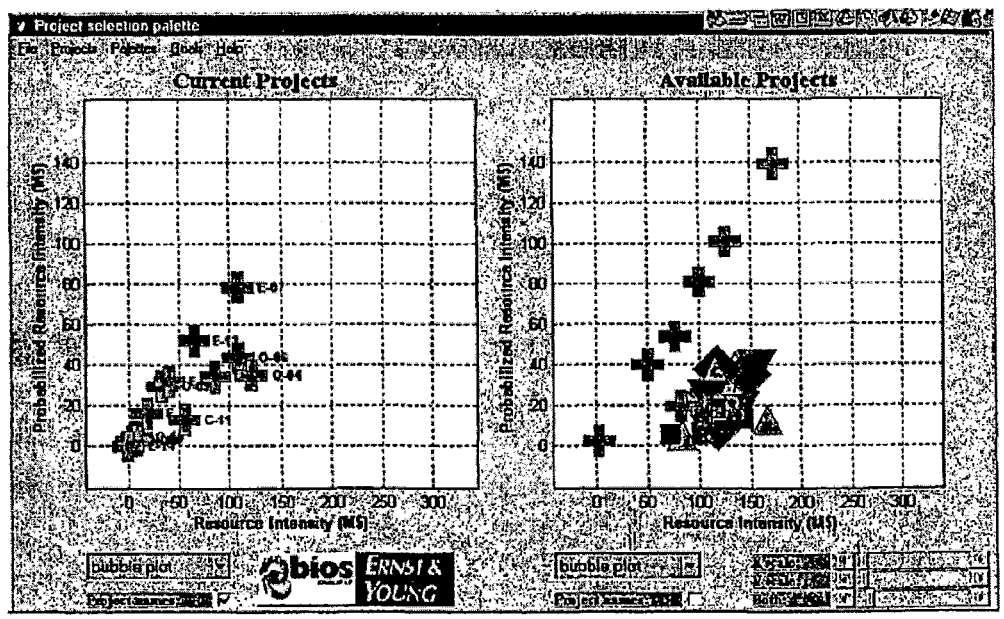
Figures 1, 2, 3, 4, 5, 6, 7, 8, 9, 10, 11, 12, 13, 14, 15, 16, 17, 18, 19, 20:
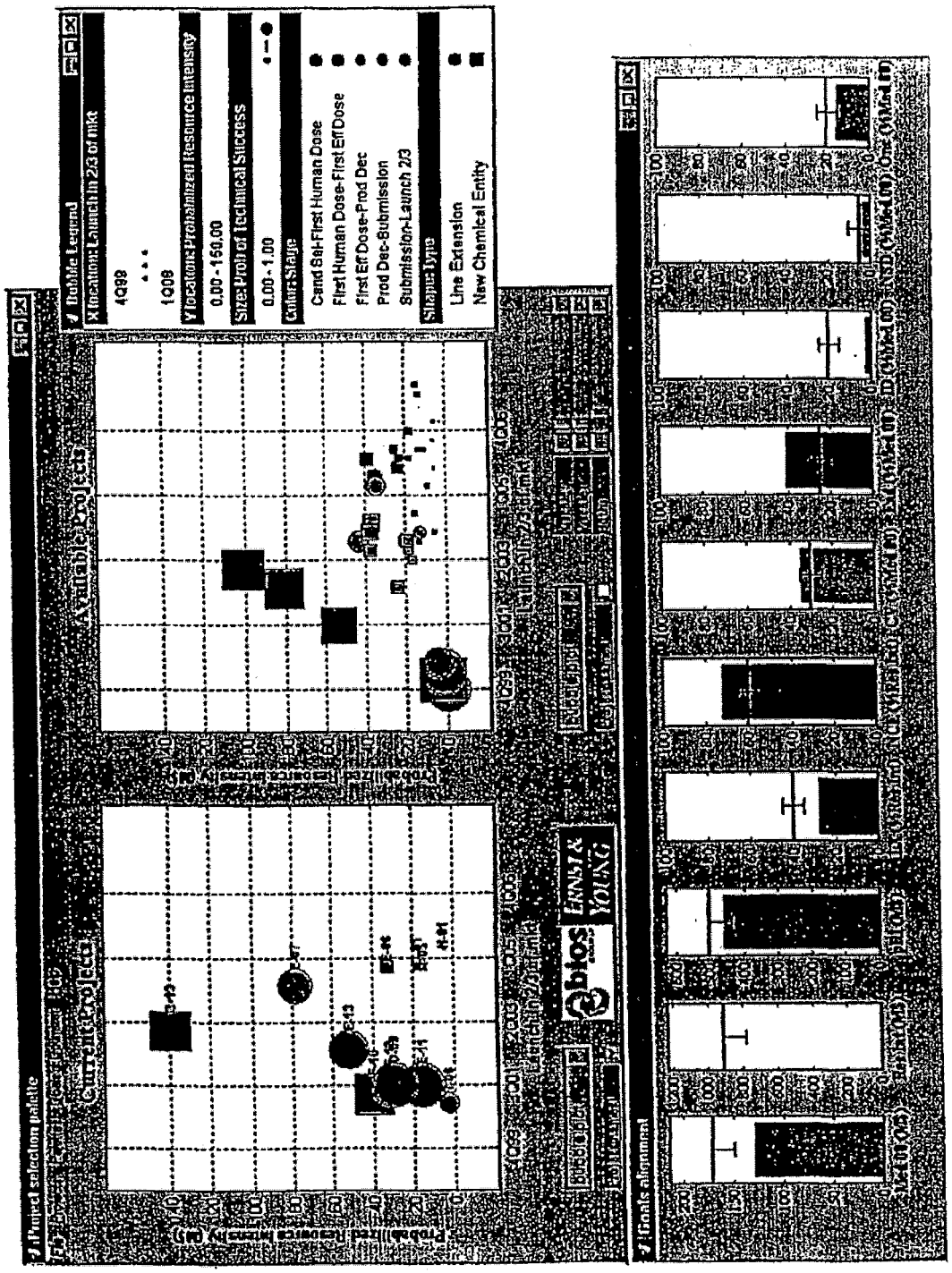
Figures 1, 2, 3, 4, 5, 6, 7, 8, 9, 10, 11, 12, 13, 14, 15, 16, 17, 18, 19, 20, 21:
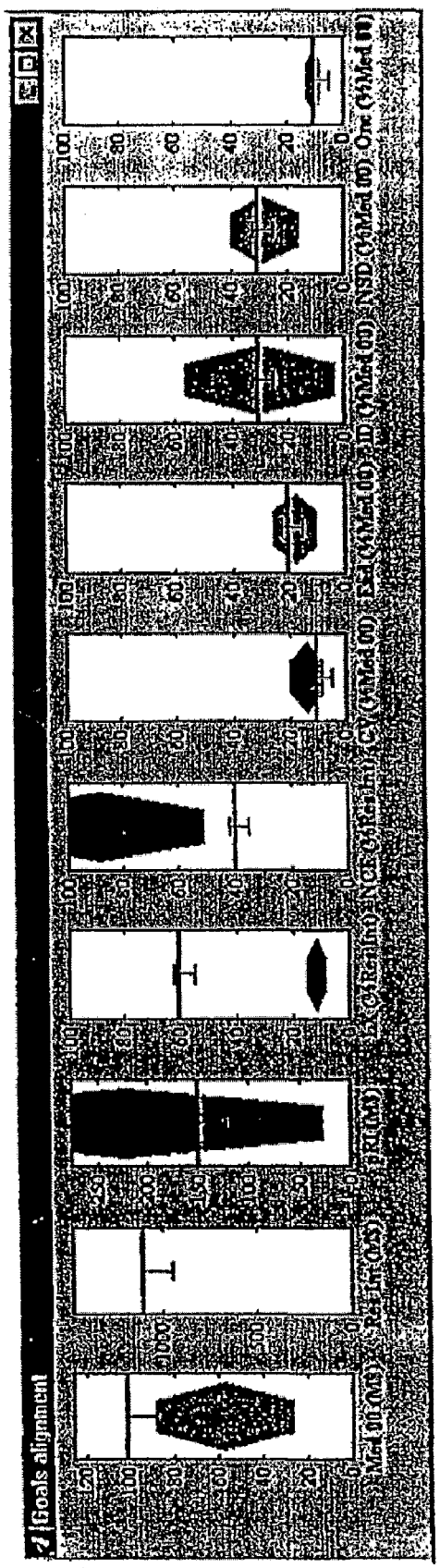
Figures 1, 2:
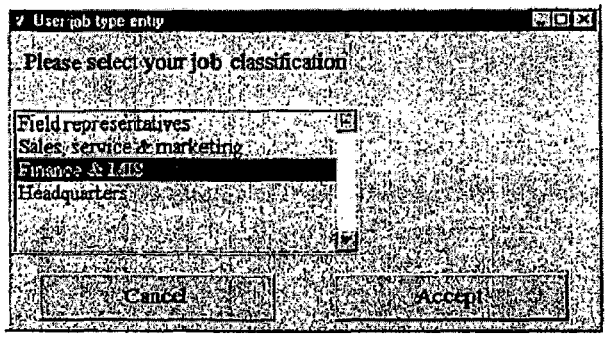
Figure 2:
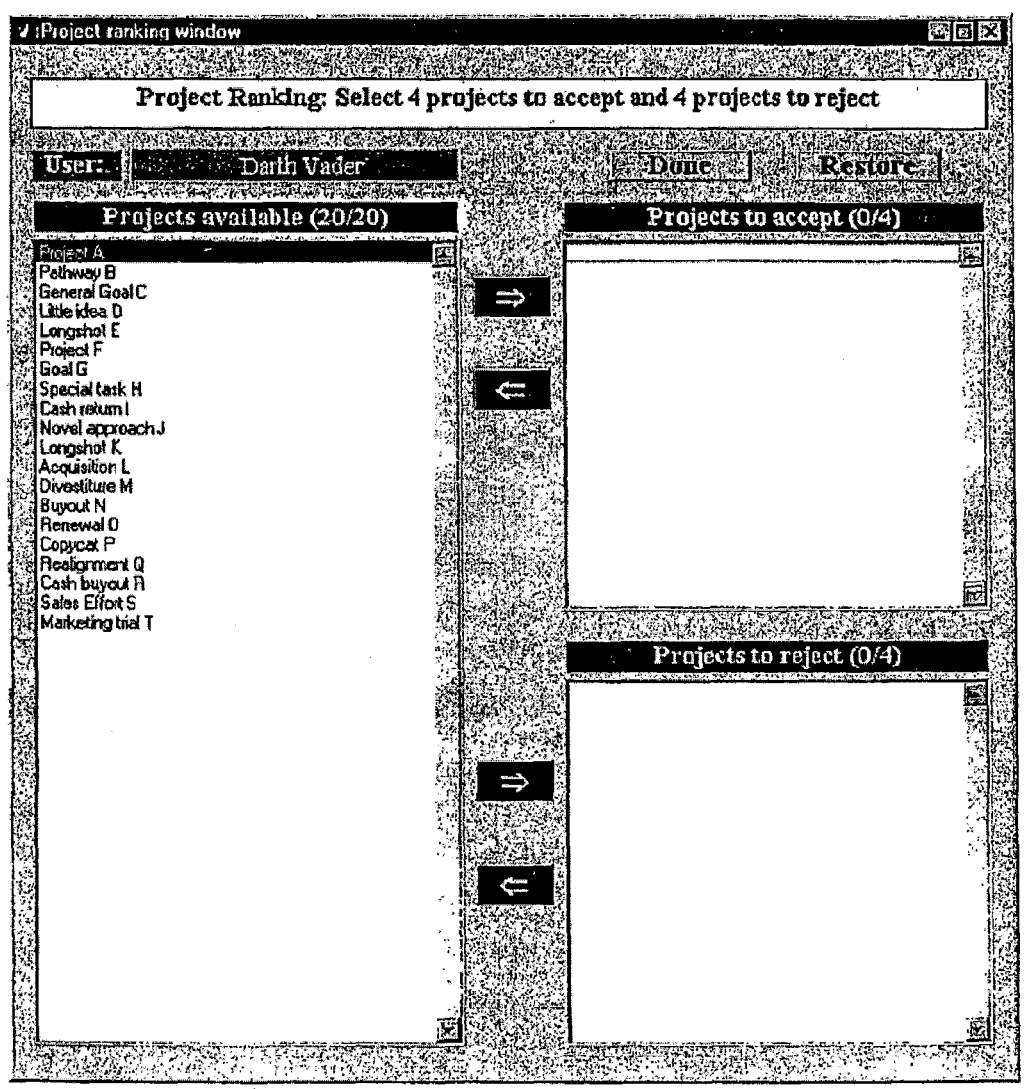
Figures 2, 3:
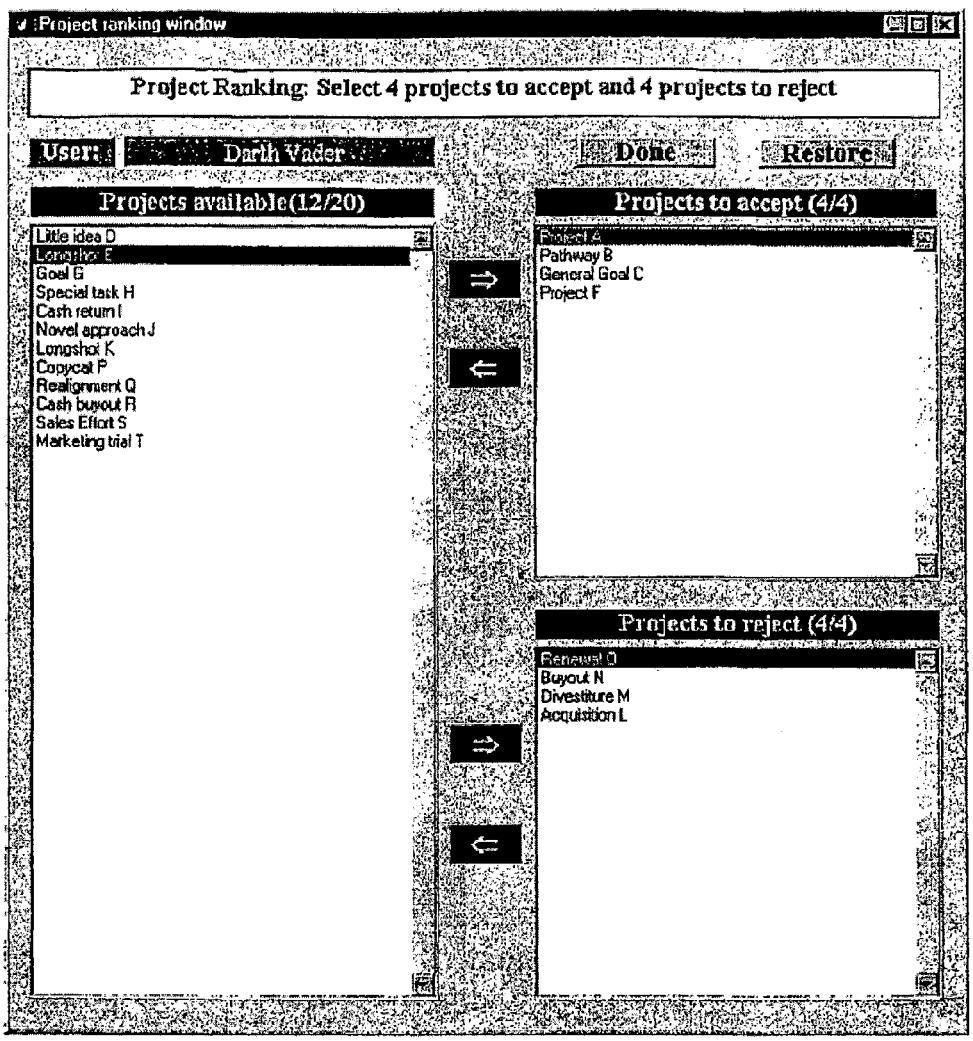
Figures 2, 3, 4:
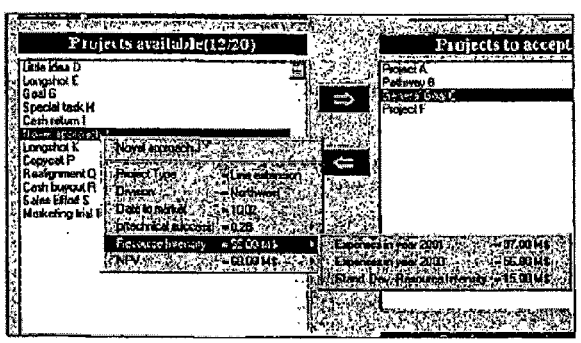
Figures 2, 3, 4, 5:
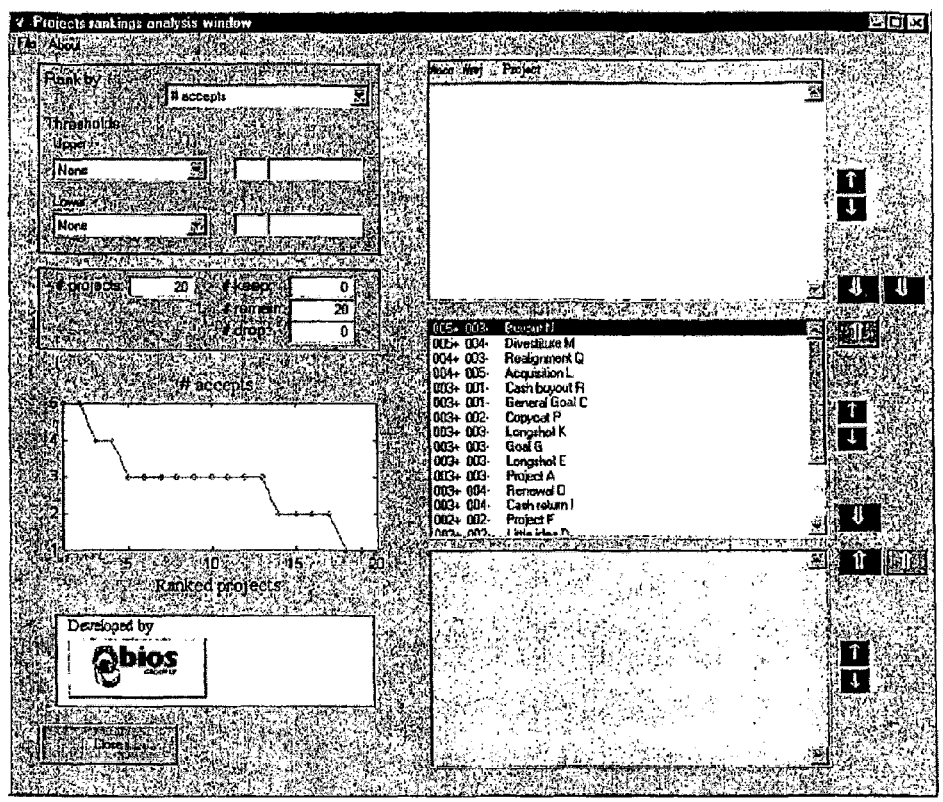
Figures 2, 3, 4, 5, 6:
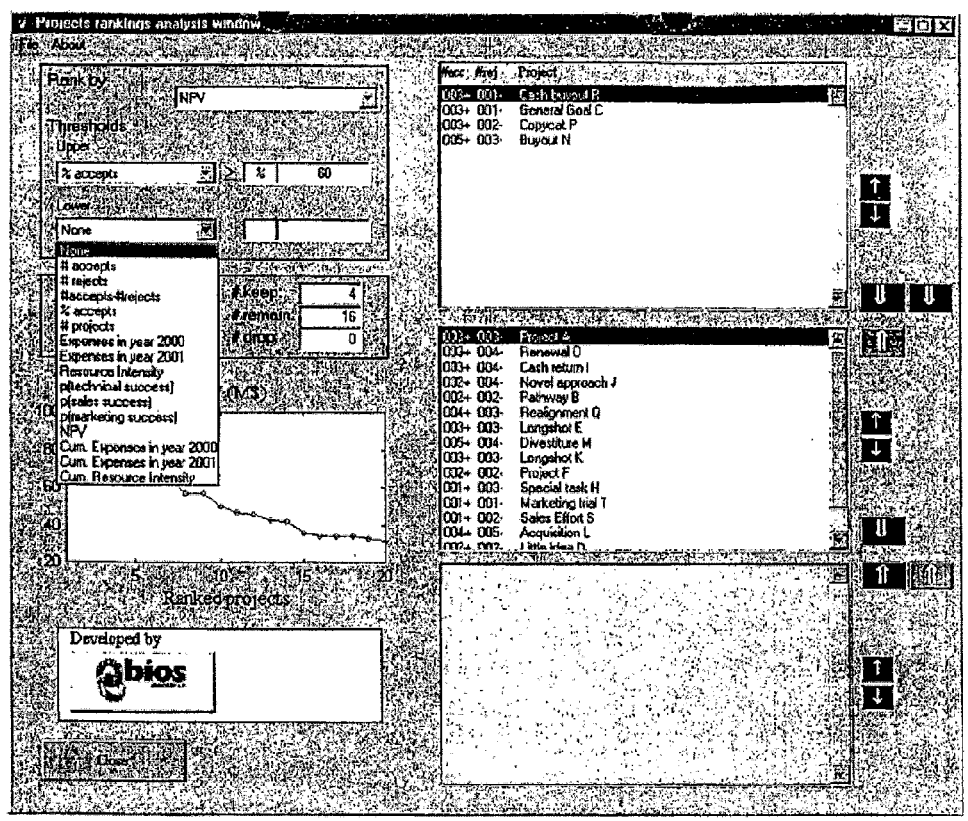
Figures 2, 3, 4, 5, 6, 7:
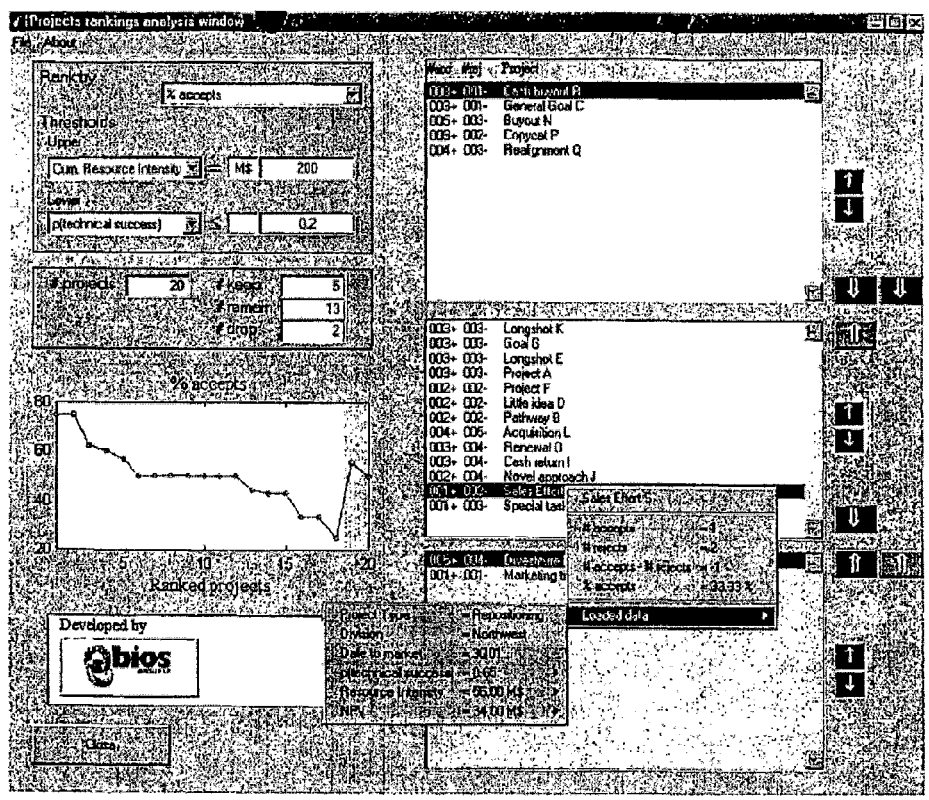
Figures 1, 2, 3:
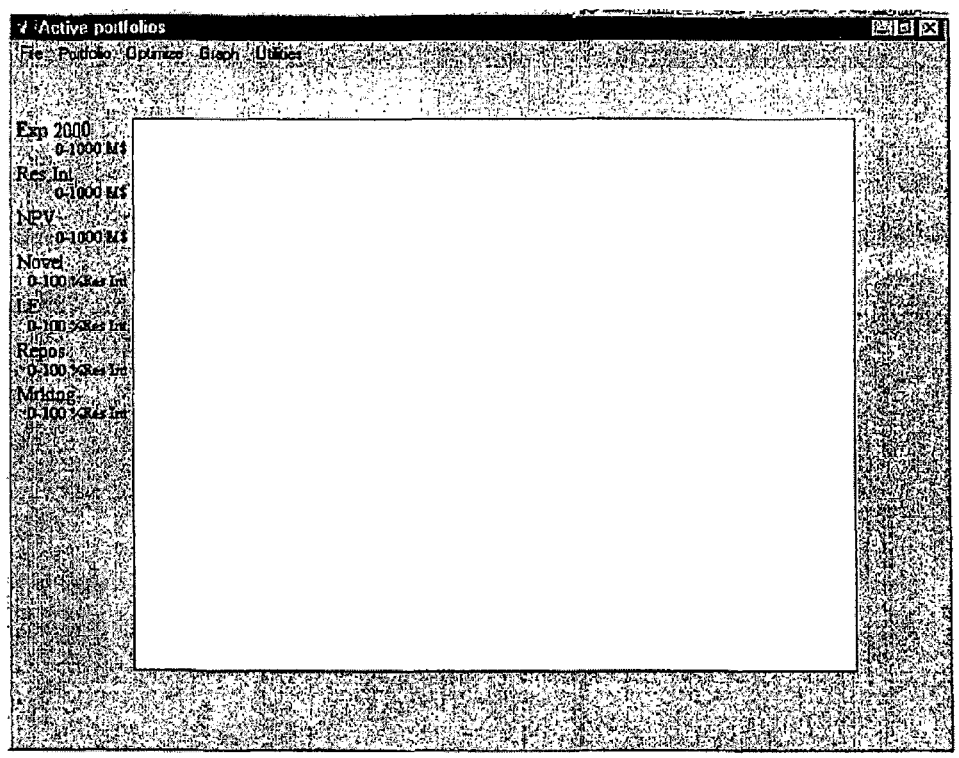
Figure 3:
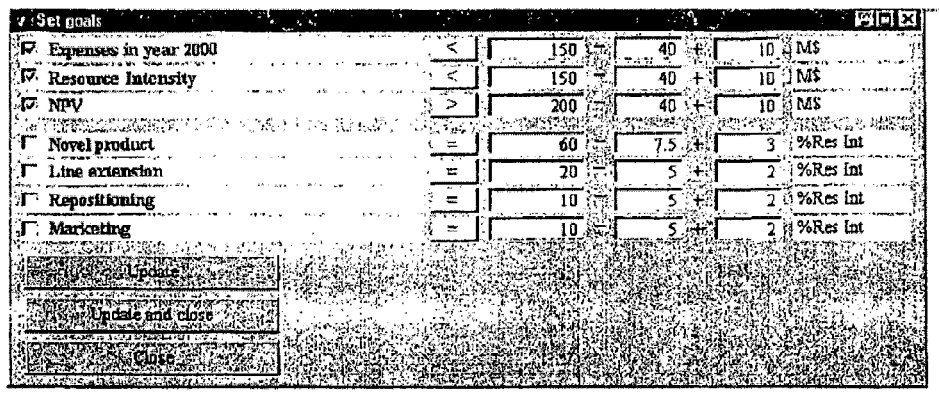
Figures 3, 4:
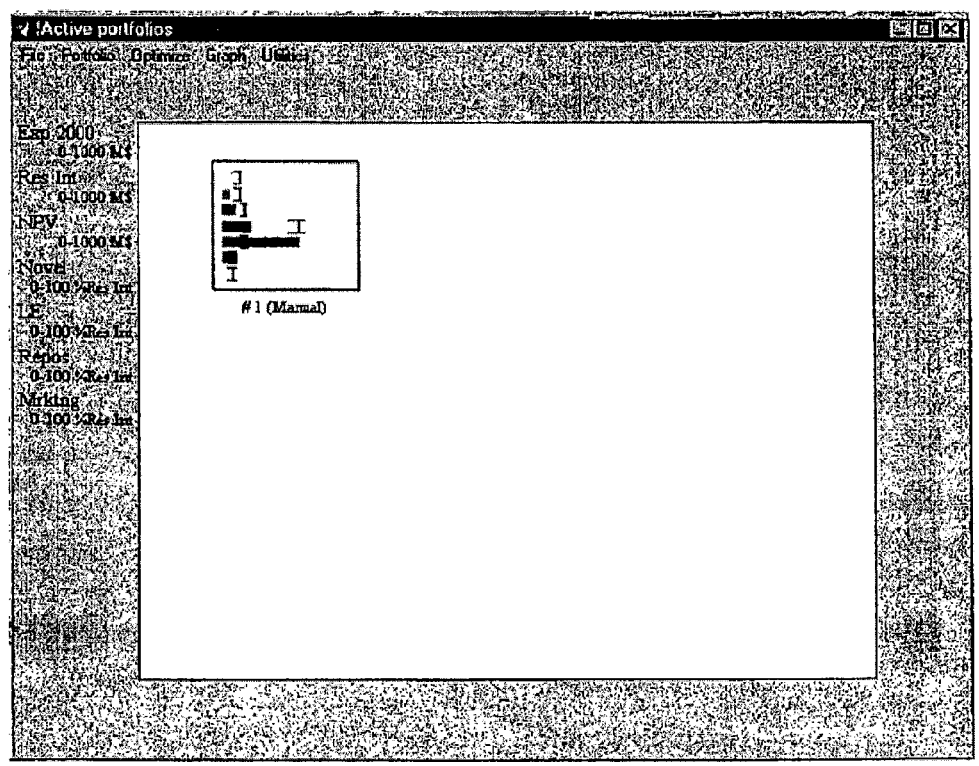
Figures 3, 4, 5:
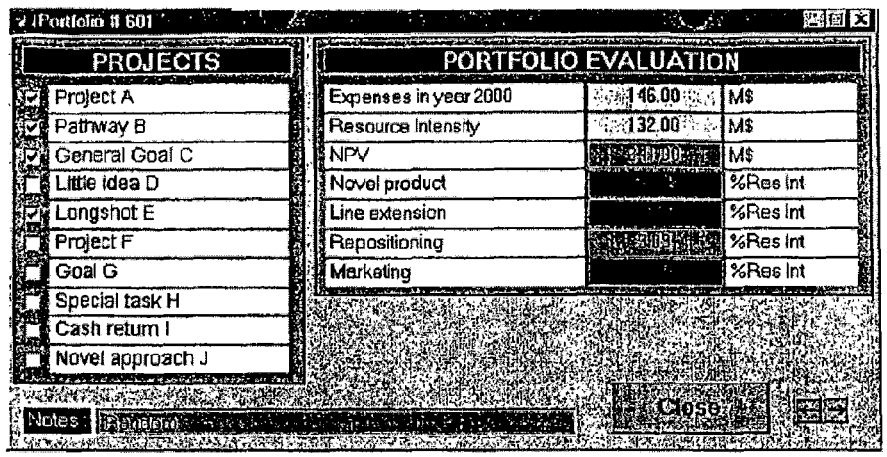
Figures 3, 4, 5, 6:
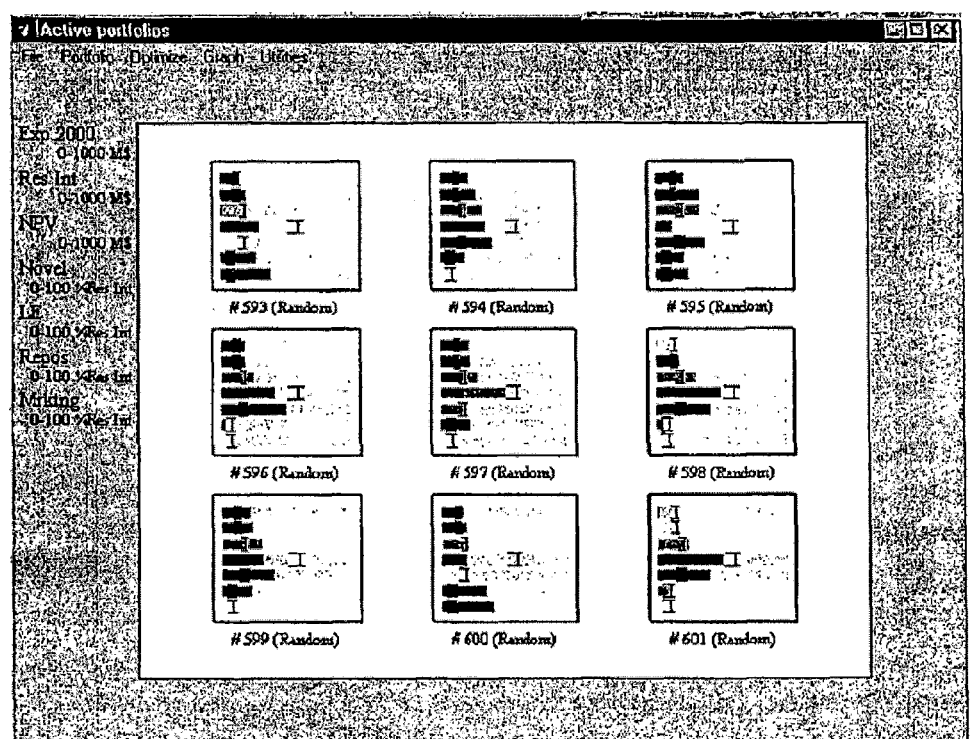
Figures 3, 4, 5, 6, 7, 8:
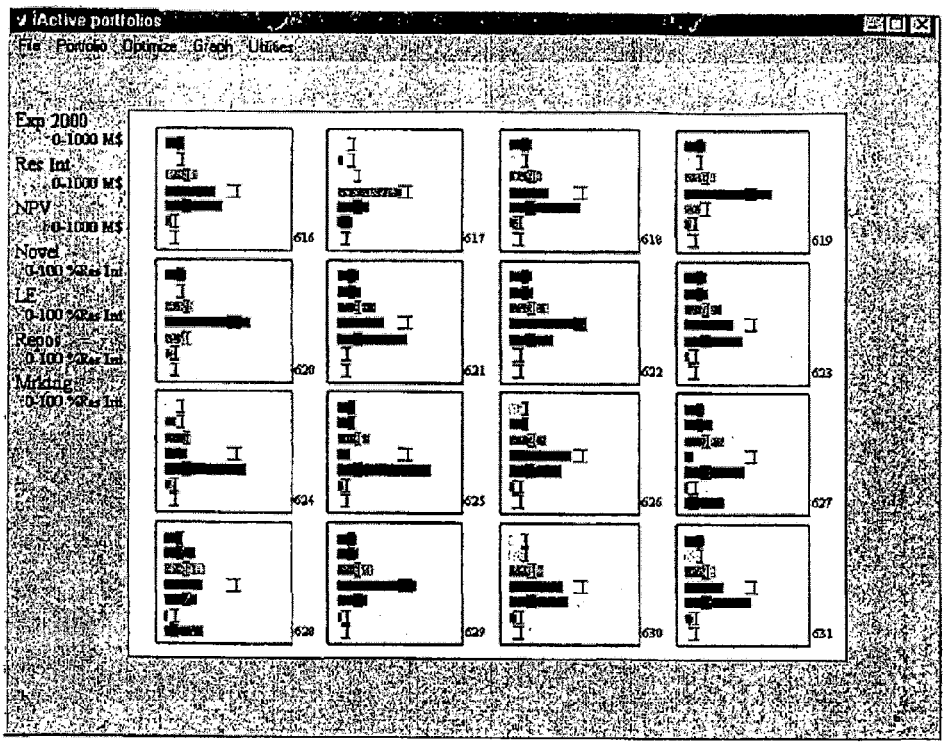
Figures 3, 4, 5, 6, 7, 8, 9:
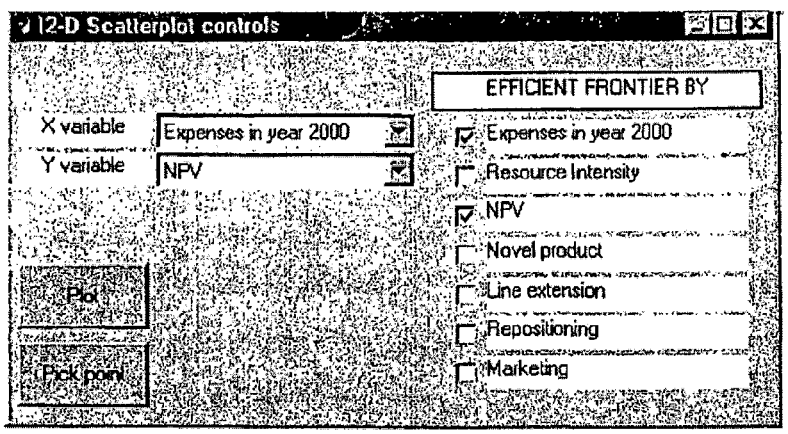
Figures 3, 4, 5, 6, 7, 8, 9, 10:
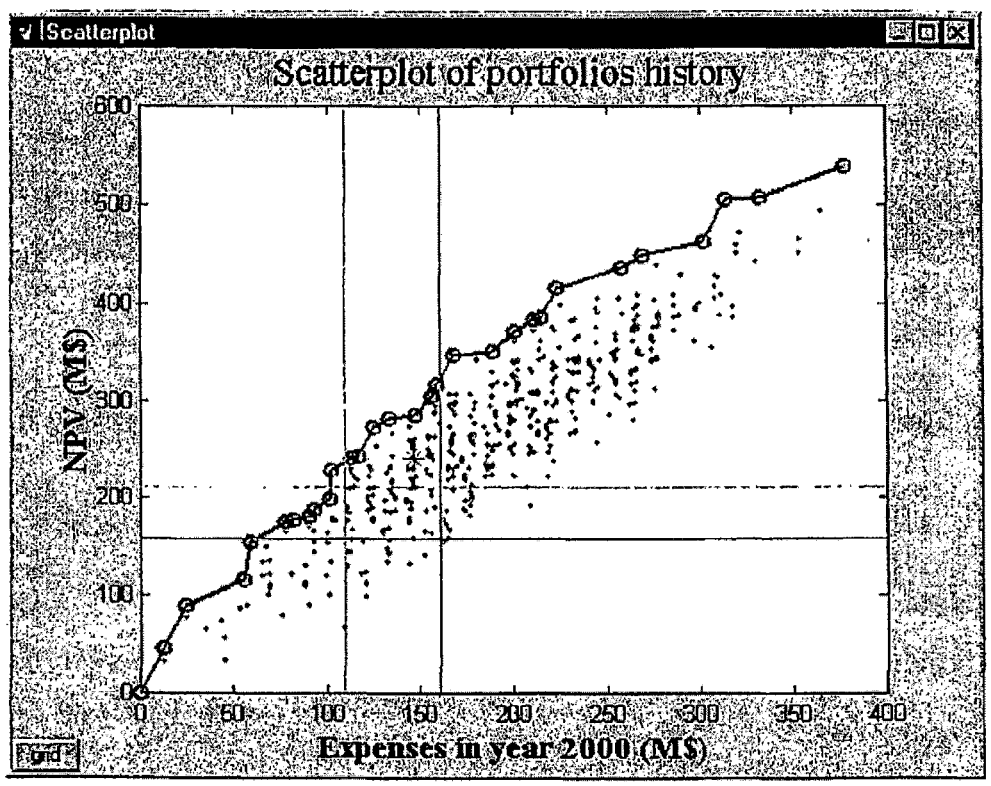
Figures 3, 4, 5, 6, 7, 8, 9, 10, 11:
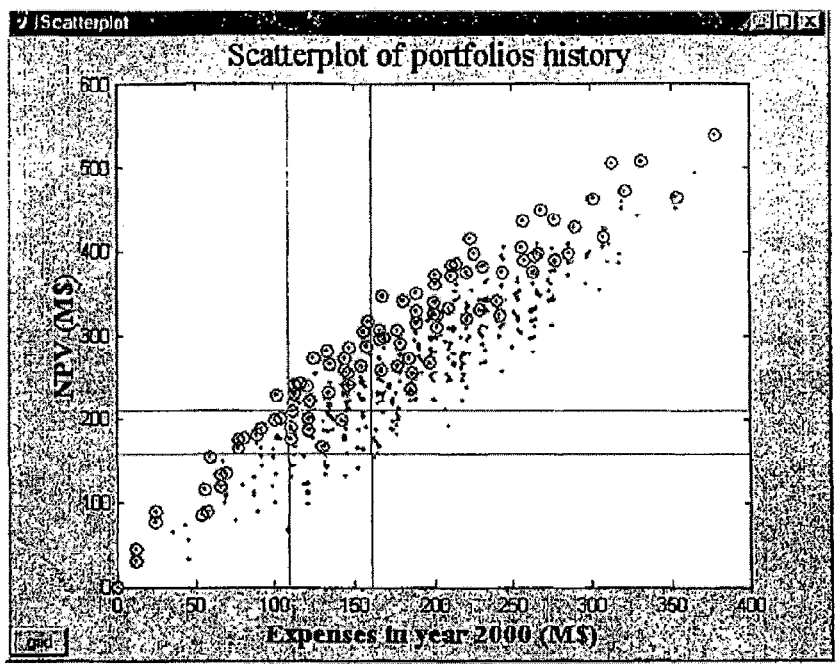
Figures 3, 4, 5, 6, 7, 8, 9, 10, 11, 12:
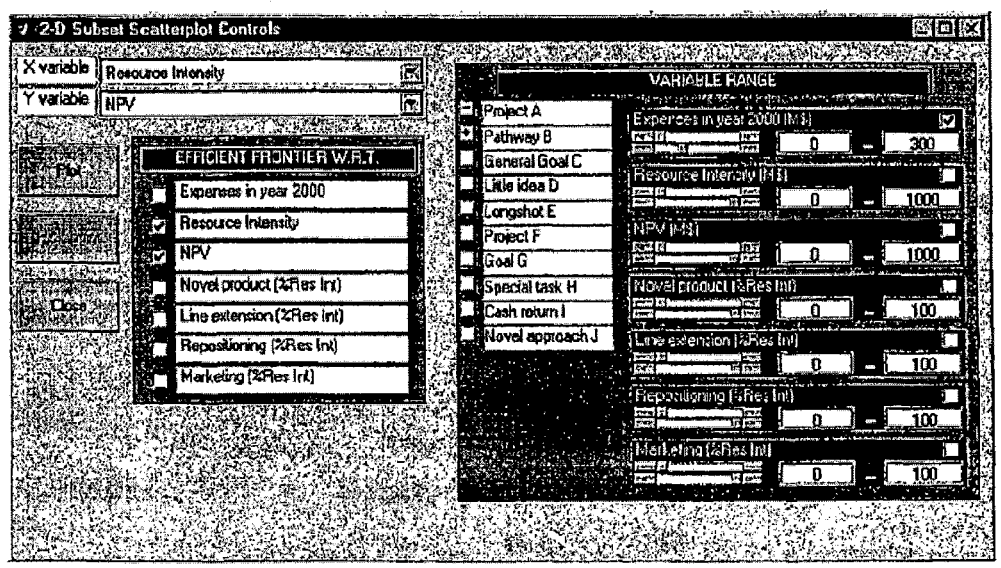
Figures 3, 4, 5, 6, 7, 8, 9, 10, 11, 12, 13:
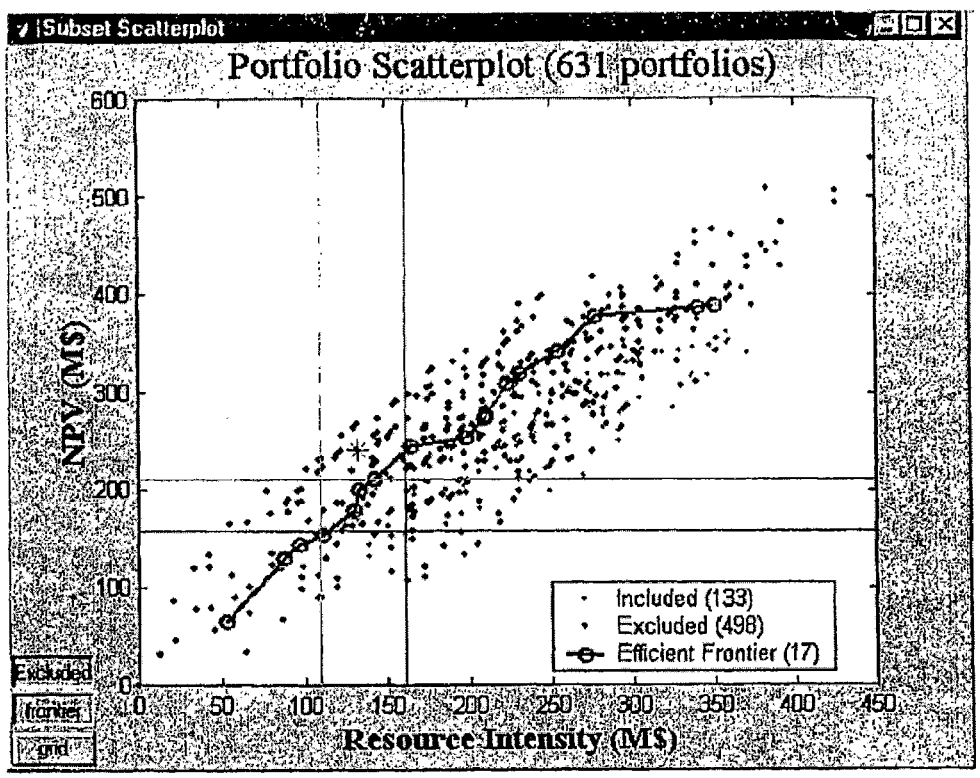
Figures 3, 4, 5, 6, 7, 8, 9, 10, 11, 12, 13, 14:
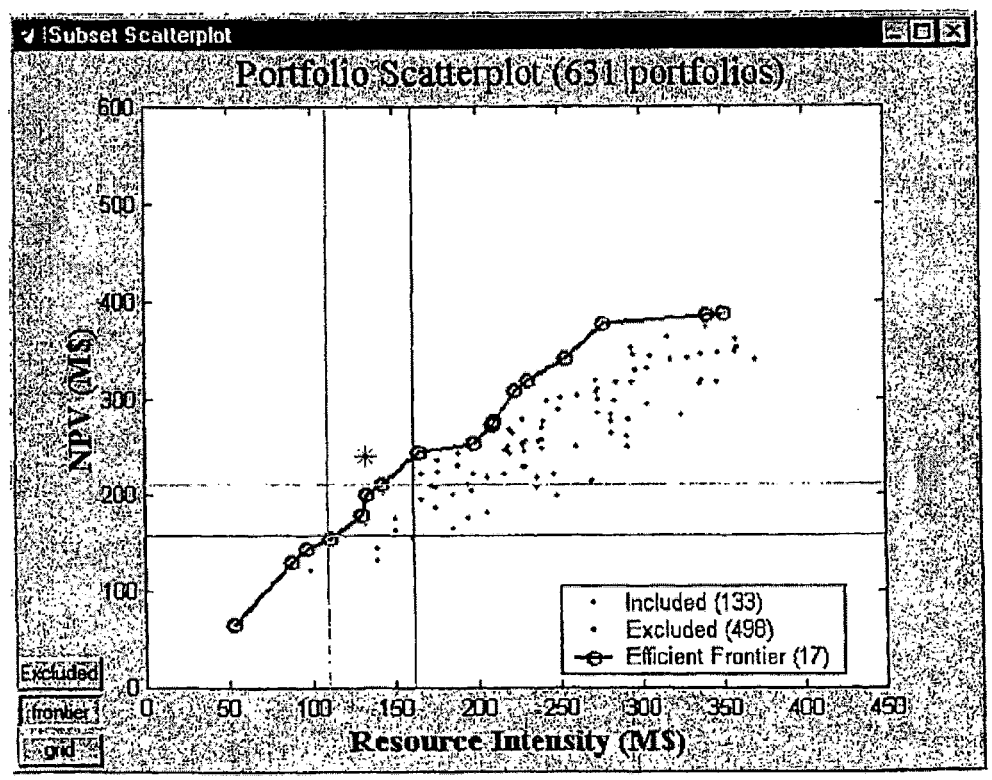
Figures 3, 4, 5, 6, 7, 8, 9, 10, 11, 12, 13, 14, 15:
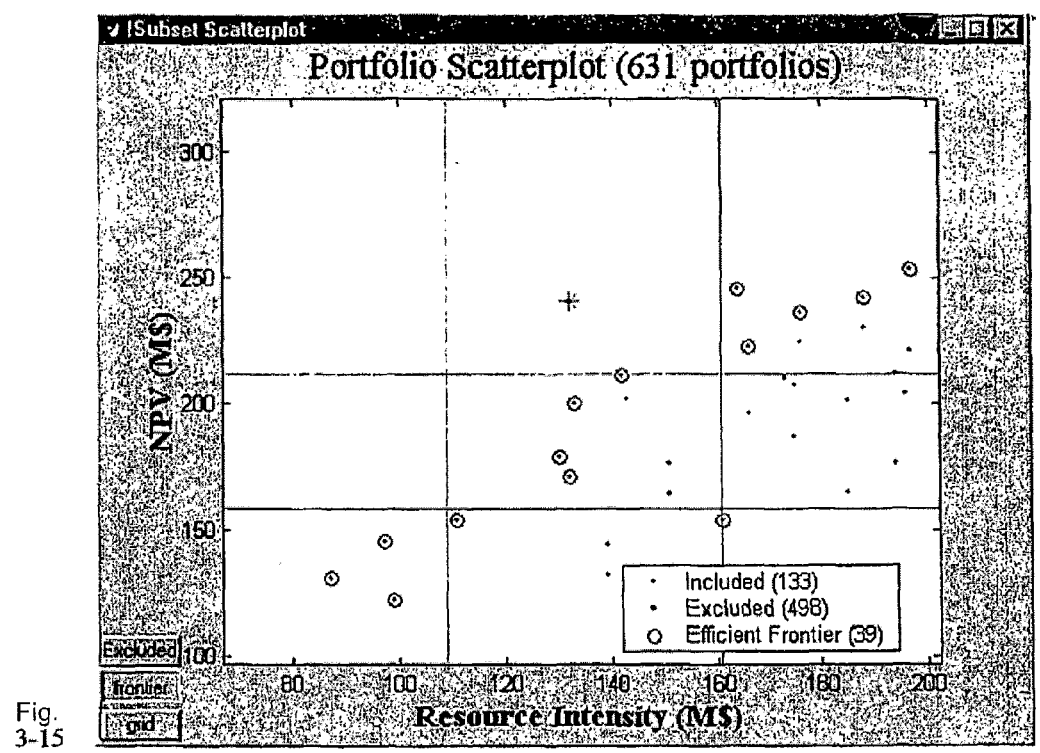
Figures 3, 4, 5, 6, 7, 8, 9, 10, 11, 12, 13, 14, 15, 16:
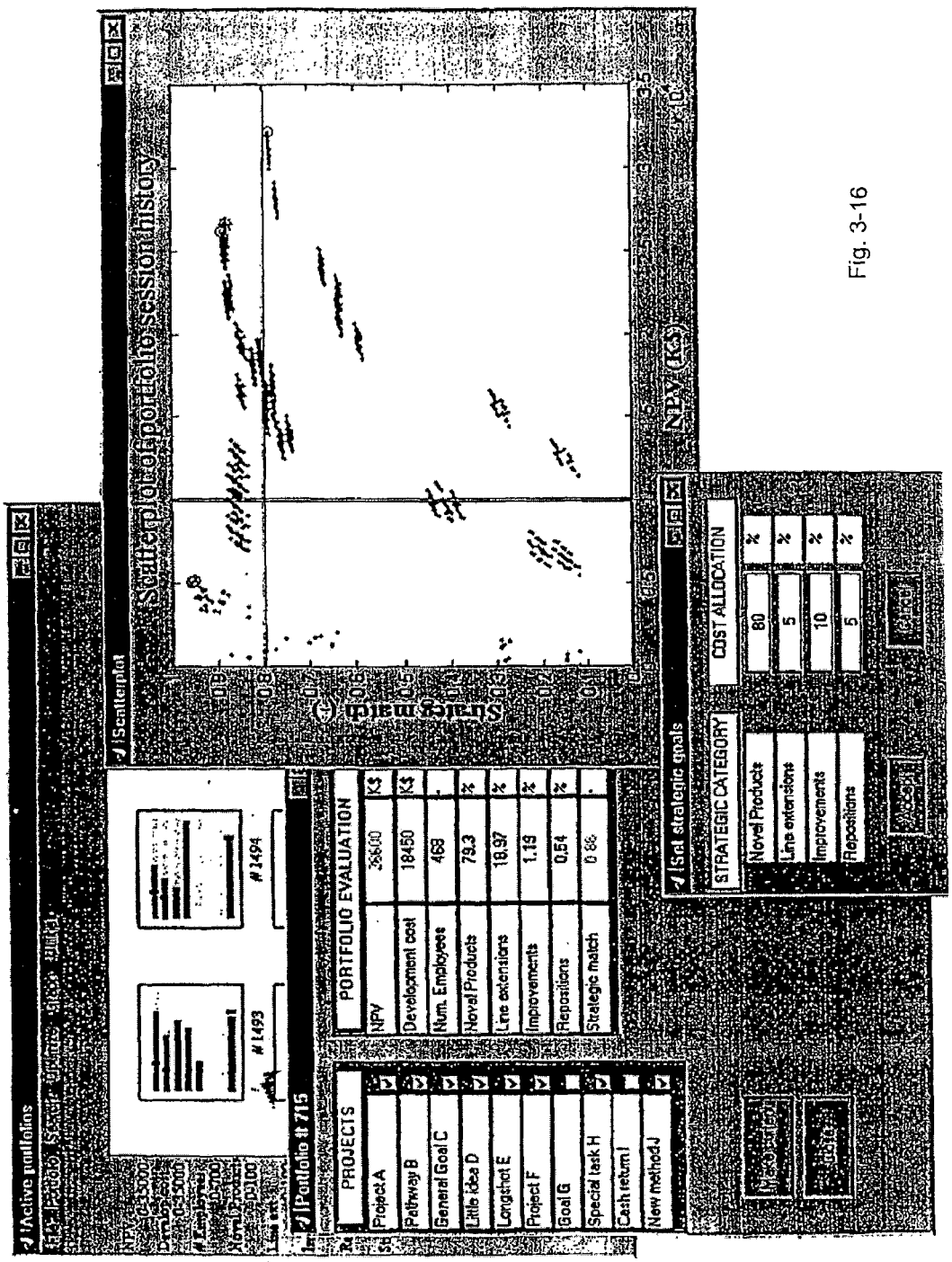
Figures 3, 4, 5, 6, 7, 8, 9, 10, 11, 12, 13, 14, 15, 16, 17:
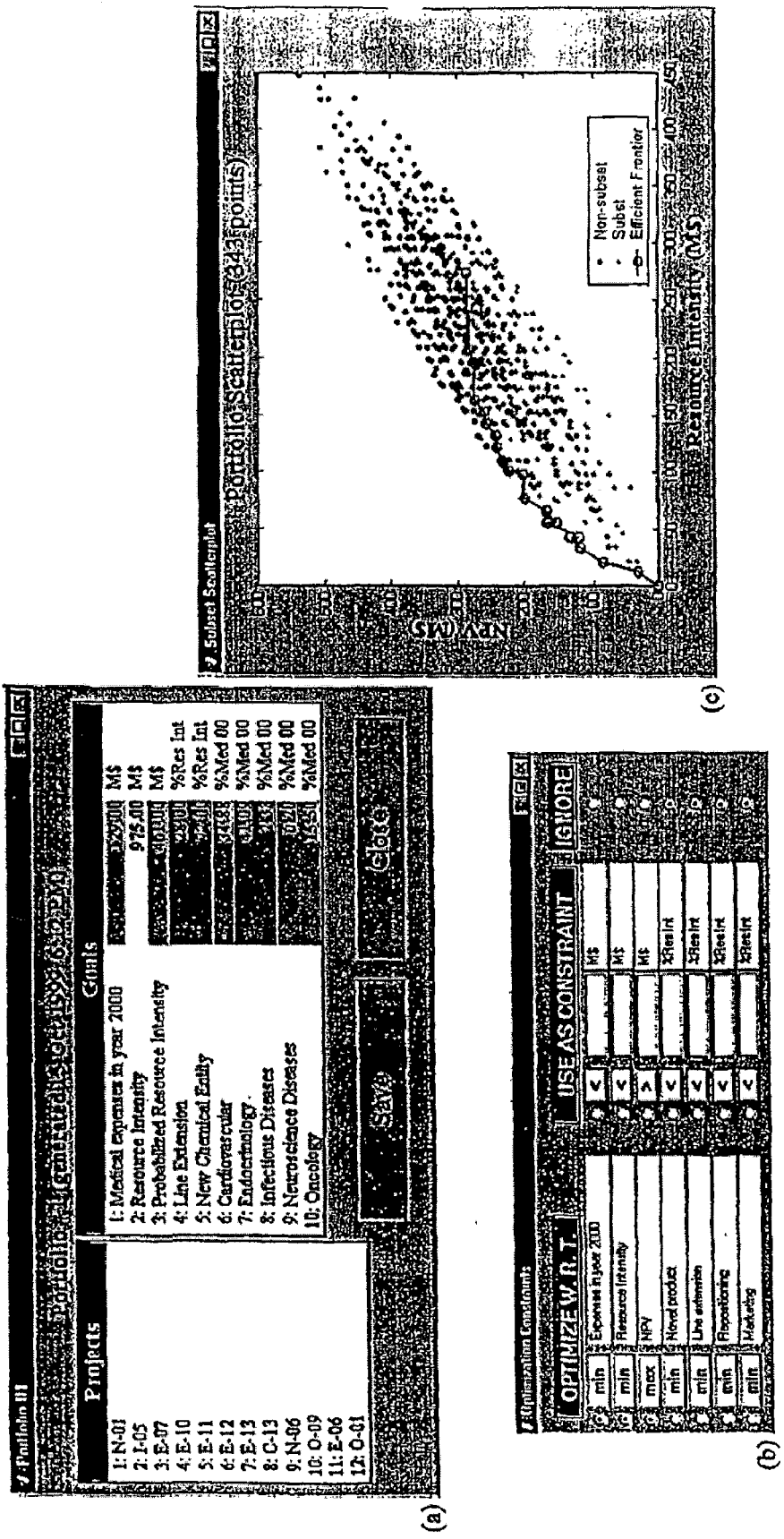
Figures 1, 2, 4:
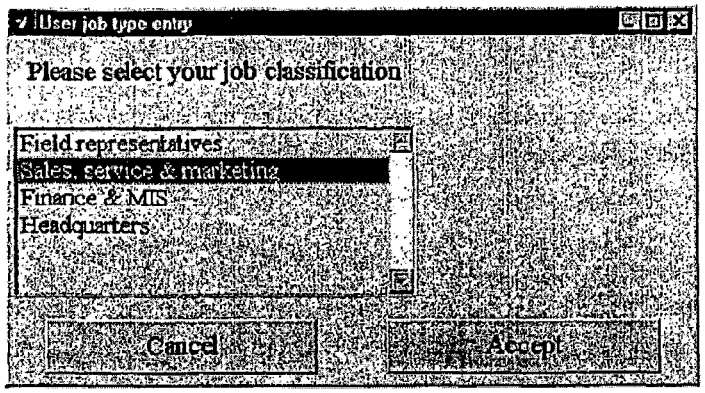
Figures 3, 4:
Figures 4, 5:
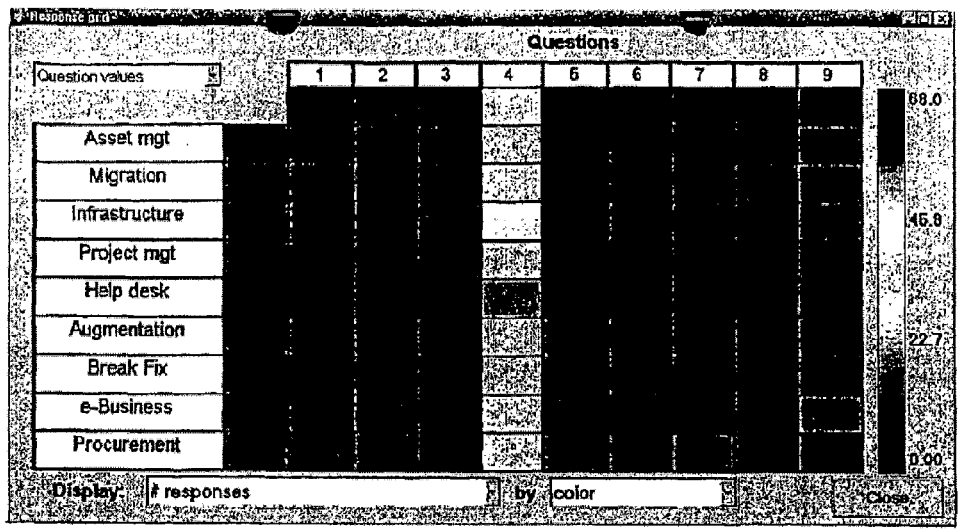
Figures 4, 5, 6:
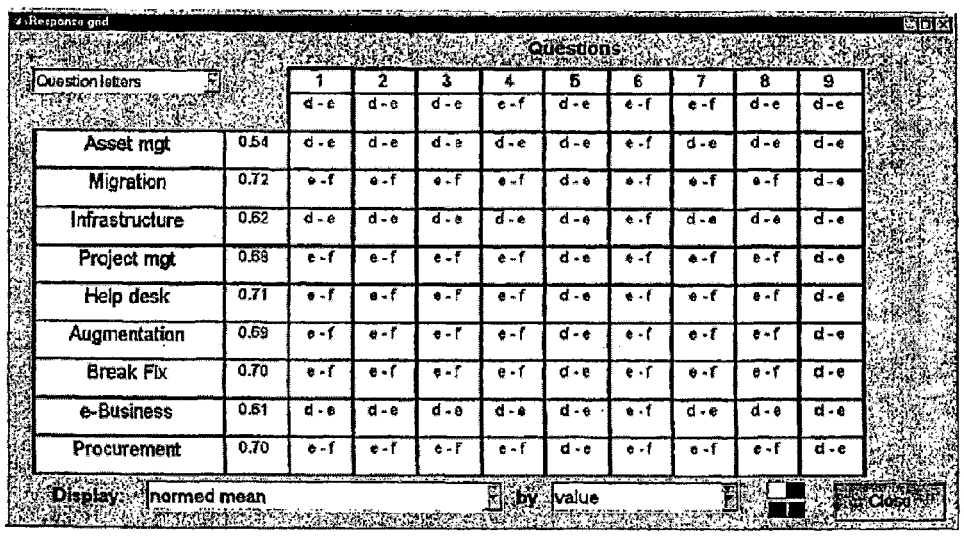
Figures 4, 5, 6, 7, 8:
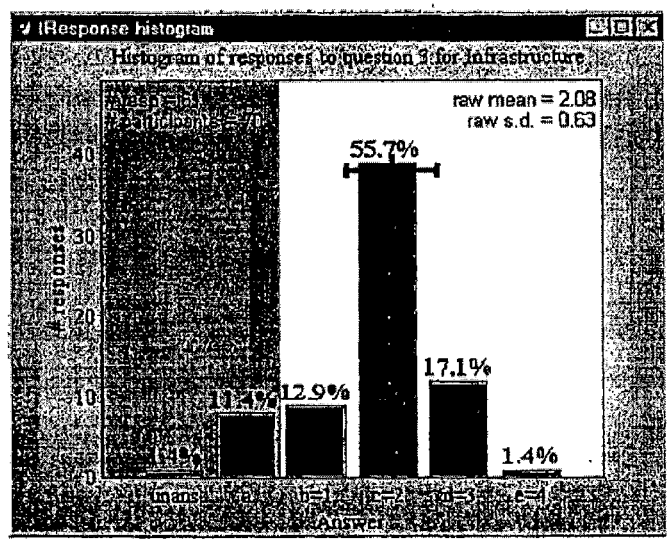
Figures 4, 5, 6, 7, 8, 9, 10, 11:
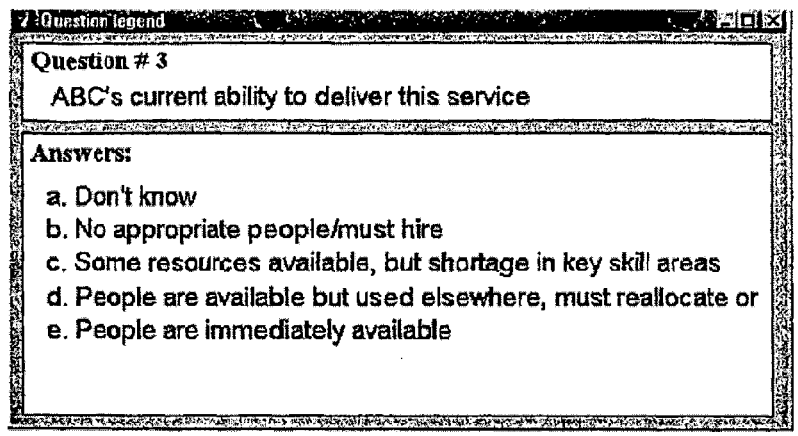
Figures 4, 5, 6, 7, 8, 9, 10, 11, 12, 13, 14:
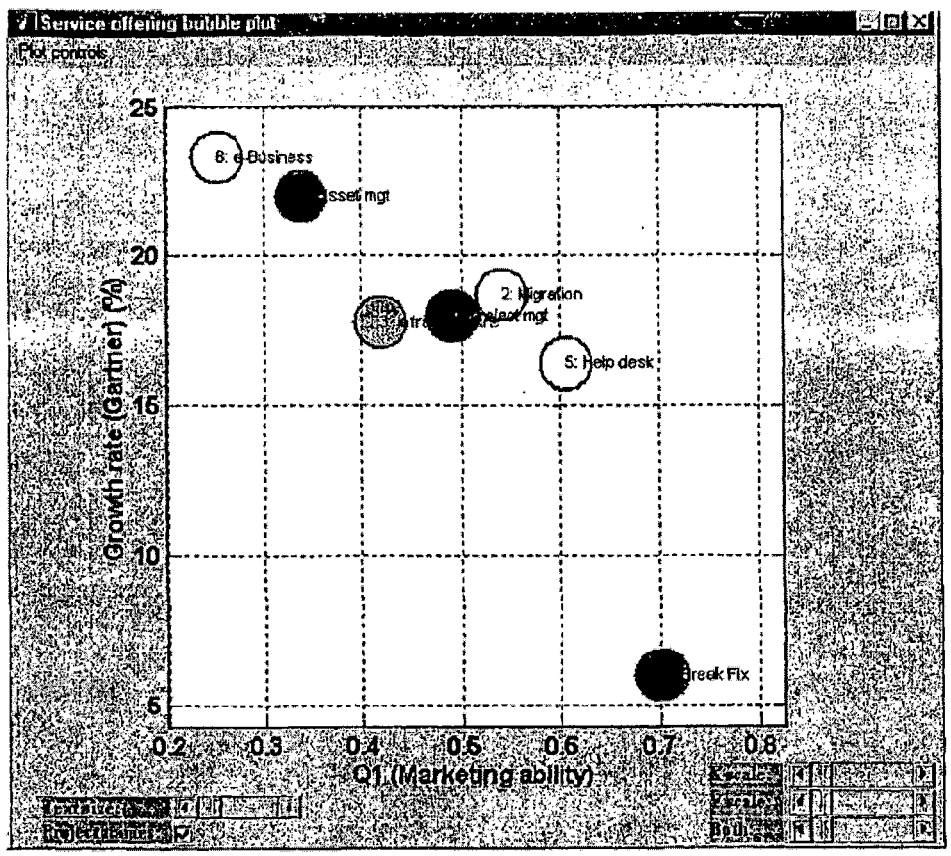
Figures 4, 5, 6, 7, 8, 9, 10, 11, 12, 13, 14, 15:
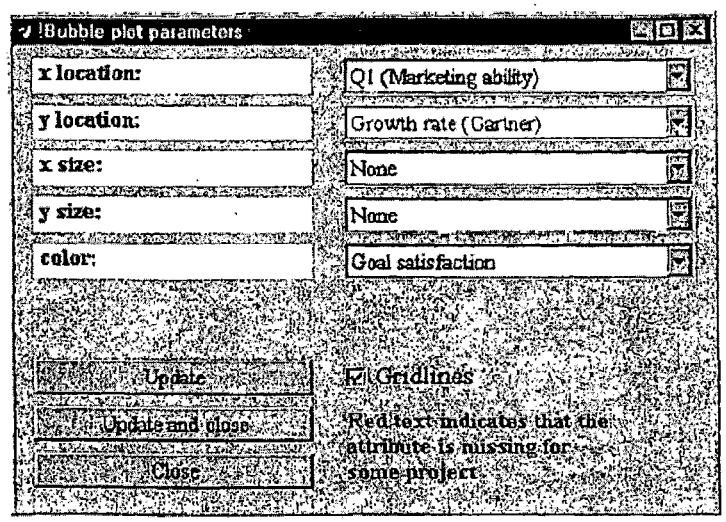
Figures 4, 5, 6, 7, 8, 9, 10, 11, 12, 13, 14, 15, 16:
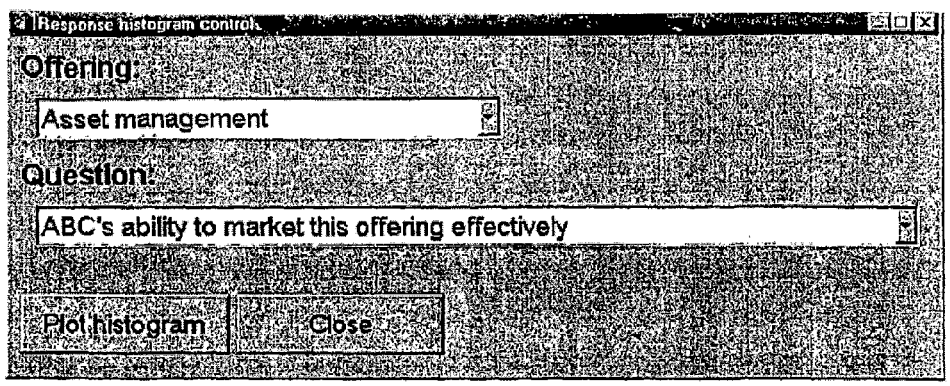
Figures 4, 5, 6, 7, 8, 9, 10, 11, 12, 13, 14, 15, 16, 17:
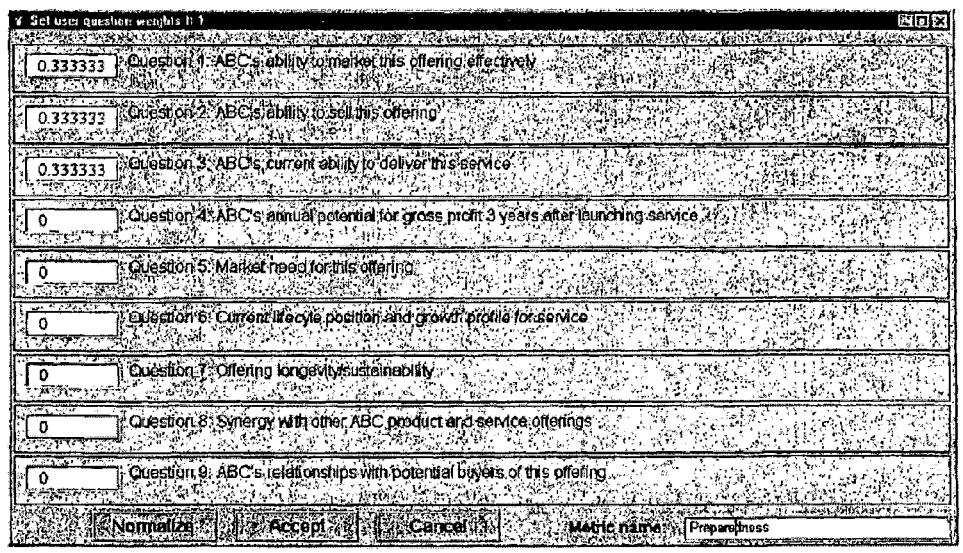
Figure 5:
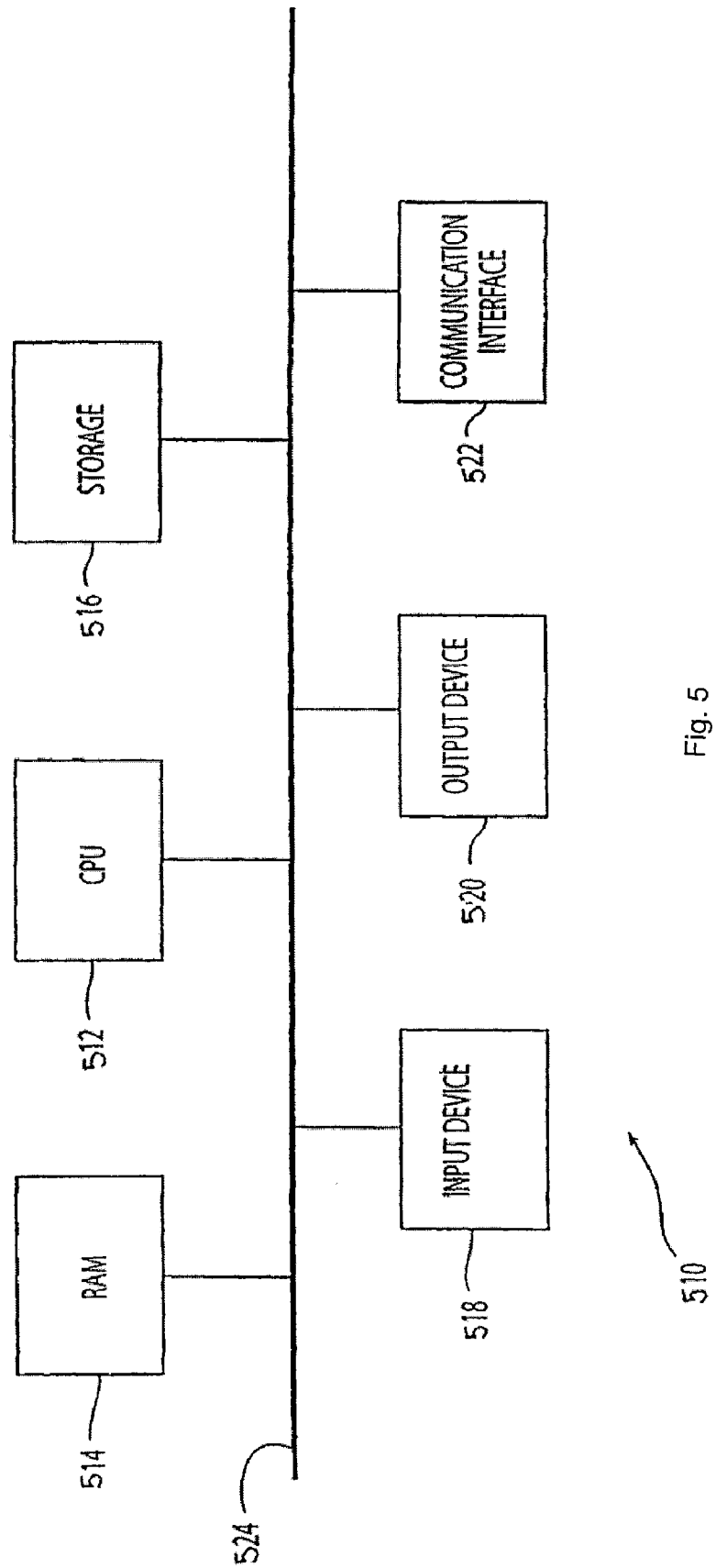

FIG. 4-6 shows a Response grid showing the normalized mean response to questions.

FIG. 4-7 displays a Response grid showing the normalized standard deviation of responses to each project/question.

FIG. 4-8 shows a histogram of responses to a particular question for a particular project.

When the histogram in FIG. 4-8 is shown, another window shown in FIG. 4-9 is displayed giving the legend for the relevant question.

FIG. 4-10 shows Initial rank and sort grid.

FIG. 4-11 shows the sort menu item on the rank and sort grid which allows sorting the projects according to any of the type of data loaded for the projects.

FIG. 4-12 shows a Set goals window.

FIG. 4-13 shows a Rank and sort grid after setting goals from growth rate, market size and percent qualified technicians and engineers.

FIG. 4-14 shows a Bubble plot linked to the scorecard analysis tool. Clicking a button on the rank and sort window puts up this plot.

FIG. 4-15 shows a Bubble plot parameters window.

FIG. 4-16 shows a Response histogram controls window.

FIG. 4-17 shows a Set user question weights window.

FIG. 5 discloses a representative computer system in conjunction with which the embodiments of the present invention may be implemented.

DETAILED DESCRIPTION OF THE PREFERRED EMBODIMENT

I Introduction

There is no one portfolio management approach or tool that will work for all companies. However, many companies can share similar techniques in their overall solutions to portfolio management. The present invention comprises a suite of modular tools that can be easily configured and mixed so as to rapidly devise customized solutions for a company. The modules include:

Probabilistic risk/benefit project and portfolio evaluation models
   Project, platform and portfolio visualization tools
   Group decision-making tools
   Multiobjective optimization and tradeoff analysis
   Customized project and portfolio simulations The present invention further includes a customized solution consisting of a mixture of the appropriate modules and possible custom development of a new module. These modules contain a mixture of qualitative and quantitative approaches, intelligent use of visualization for decision-making throughout, use of optimization techniques so as to allow assessment of the tradeoffs between portfolios, and probabilistic approaches so as to clearly distinguish certain from uncertain data and results. The mathematically rigorous approaches are used to overcome many of the simplistic assumptions often used in project portfolio management. The present invention further includes the construction of electronic facilities for large group portfolio management activities. Such a system enables training and practice in the proper usage of these tools and their extension to future company needs. Exemplary customers for the present invention include a pharmaceutical company and an oil petroleum company.

1. Probabilistic Risk/Benefit Project and Portfolio Evaluation Models

Many mathematical analyses of project portfolios ultimately depend on such unrealistic assumptions as Gaussian distributions of costs, exact values for probabilities of technical or commercial success, independence of costs and success probabilities between projects, and relatively simple models of the maturity of projects over time. The present invention includes customized probabilistic models that do not rely on these types of assumptions. Using innovative approaches such as Bayesian networks and "fat-tailed" distributions or more standard approaches from commodities management such as covariance matrices, value-at-risk and dynamic financial analysis, the present invention includes models of the relationships not only within a project but between projects. These models can give probability distributions of estimated risks and benefits both at the moment and over time, and they can represent some of the complex interdependencies among projects that mature at different time scales.

Typically, the highly limited and uncertain data in project portfolio management problems limits the applicability of mathematical approaches; however, with the proper use of probabilistic techniques, the uncertainty becomes a tool to guide decisions where appropriate and limit decision-making when the relevant results are too speculative. One particularly useful variant of the present invention uses options pricing theory to evaluate the risks of long-term projects with low probability of success but potentially high payoffs. Standard project assessment models (e.g. discounted cash flow analysis) tend to unfairly penalize such projects when comparing potential projects. The recent realization that options theory, when suitably modified to real options, can more accurately assess projects has sparked a revolution in some industries. There is not only danger in uncertainty but also opportunity. Real options provides a proven method by which this opportunity can be assessed.

2. Project, Platform and Portfolio Visualization Tools

The models behind product portfolio analysis can involve hundreds of variables and several measures of risk and potential payoffs. To interpret results, companies often employ various means of visualizing tradeoffs within a portfolio and comparisons between portfolios, such as bubble diagrams and related plots. Companies have devised a wealth of such plots, and a portfolio evaluation team typically spends significant effort devising the plots that work best for their company.

For evaluating the composition of a portfolio, the present invention includes an extremely versatile portfolio risk/payoff visualization tool that allows users to define custom 2-D bubble diagrams with arbitrary correspondences between symbol/bubble characteristics and all project assessment criteria. Any variables used in the risk/payoff scorecards, probabilistic risk and payoff calculations, or values collected during interactive group portfolio evaluation sessions can be represented. With assignment of variables to plot characteristics in a fashion appropriate for a given company, it is possible to develop intuition on how projects relate in up to nine different characteristics all from one plot—including comparisons between short and long-term project characteristics.

A common limitation of portfolio management software currently available is that it is difficult to simultaneously optimize a portfolio for certain characteristics while balancing it with respect to numerous criteria and also aligning the portfolio with a company's defined strategy. The present invention includes visualization and tradeoff plots that allow for combining precisely these needs. With a mixture of the "what if" tools and multiobjective optimization methods described below, these plots allow a group to rapidly compare portfolios with respect to optimized criteria, balance, and strategic alignment.

For consideration of tradeoffs between different candidate portfolios, the present invention also has tradeoff visualizations that tie directly into the outputs of multiobjective optimizers, as described in more detail below.

3. Group Decision-Making Tools

In certain industries, much of project portfolio management is based on qualitative data and general impressions; and quantitative models can only help to a limited extent. In other industries, or for large companies, managers and executives may be deliberating amongst several hundred projects, and extensive discussion on them all is impossible. The present invention includes a variety of tools for group decision-making that streamline the discussion, analysis and ranking of projects in a group setting. Qualitative ranking systems allow participants to rank or sort projects individually, and software instantly tallies their choices into a ranking of projects. Such a ranking provides a quick and painless means to start sorting many projects. Other tools allow for the group as a whole to sort and compare projects, with or without quantitative data to assist in the decisions. "What if" tools allow individuals or groups to interactively create and alter a candidate portfolio, instantly seeing visual and numeric characterizations of the quality of the candidate. Seamless integration with the visualization, probabilistic evaluation, and optimization modules allow routing the results of the group's deliberations to these other tools, and can serve as the basis for more stringent or quantitative next steps in portfolio analysis on the remaining projects. The present invention includes several Java-based applications involving many participants (up to 80 or more) simultaneously participating in networked, computer-controlled exercises. This modular software can be placed in one or several networked "electronic rooms" for group project management events.

4. Multiobjective Optimization and Tradeoff Analysis

Since portfolios and their constituent projects are evaluated by numerous criteria, companies often use various techniques to combine the different criteria into one ranking score with which to easily compare projects. While this approach offers the advantage of conceptual simplicity, it poses several risks for missing good portfolio choices: (1) When considering the composition of a single portfolio, such measures have been shown to miss a wide variety of potentially acceptable solutions. (2) When comparing a variety of candidate portfolios one to another, a ranking method can hide many of the tradeoffs between important criteria.

An alternative approach to ranking is to use multiobjective optimization, optimizing for several conflicting criteria simultaneously. The present invention employs such methods on projects. There are a variety of techniques in multiobjective optimization to assist individuals in understanding the tradeoffs between numerous criteria. Other techniques assist in refining vague ideas of where one would want to be on a tradeoff curve—the methods often involve iterative refinements of candidate limits to acceptable tradeoffs, subject to the constraints and probabilistic mathematics behind the problem. The present invention includes a software platform that merges multiobjective optimization with the probabilistic models, visualization tools and group decision-making tools described above.

Until now, there are no accepted ways of measuring how large the shocks are to which the market is submitted. However, in other fields, there are well accepted scales to measure the strength of an event or a shock. A familiar example is the Richter scale in geophysics [Richter, 1958]. This scale is widely used and accepted to measure the intensity of an earthquake. In sailing, a similar scale exists, called the Beaufort scale, which measures the speed of winds and the state of the sea. The advantage of a well accepted scale is that shocks can be compared to each other and risk measures can be derived from them. A meaningful quantification is an essential step toward establishing an objective and testable relationship between different events. Moreover, if the scale is well designed, it can serve as a warning signal that the market is entering a turbulent state.

5. Customized Project and Portfolio Simulations

For certain types of projects and certain industries, simple mathematical characterizations of project risks and rewards are inadequate, and complex Bayesian network or real options-like models may be very difficult to design. For these cases, or for more detailed market impact analyses, the present invention includes a variety of "agent-based" simulations. Agent-based simulations provide valuable information about the dynamics of the real-world system that they emulate. They begin with simulated agents that represent basic elements of the system—say a customer in a marketplace or a step in a logistics process. As agents interact in the model, the simulation shows how their collective behaviors govern performance of the entire system—for instance the emergence of a successful product or of an optimal schedule. These simulations are powerful strategic tools for "what-if" scenario analysis: as managers change agent characteristics or "rules" the impact of a particular strategy can be seen. Perhaps most importantly, the computer can generate strategies that the user might never have considered. The customized agent-based and other types of models of the present invention can be used by clients in a wide variety of industries. For detailed analysis, these models are integrated into the visualization, optimization and tradeoff analysis tools described above.

II Project Palette Tool

The Project Palette Tool is intended to allow an individual or a group to perform quantitative "what if" analysis and visual data mining on a project portfolio management problem. The tool is loaded with data describing (typically 5-30) properties on (typically 10-50) projects. By manipulating how the information is displayed on bubble plots, many patterns and relationships in the data often become apparent. This visual data mining can greatly ease the later process of removing projects from consideration. By moving projects into and out of the portfolio, users can instantly see the effects of different combinations of projects on portfolio properties. This "what if" analysis allows users to perform manual optimization, manual tradeoff analysis (finding the optimal tradeoffs between important portfolio properties) and constraint analysis (seeing the effect of user-imposed requirements on the tradeoff surfaces.)

FIG. 1-1 displays the Startup screen in Project Palette Tool, which is the first window shown after the splash screen. The window displays two blank panels that will be populated with project data when a session file is loaded. The right palette is the "available palette," for indicating projects that are available for consideration. The left palette is the "active palette," for showing the projects in the portfolio currently being evaluated. The only functions operating at this point are on-line help, loading a session file, and quitting the program.

FIG. 1-2 displays a Project Palette Tool Selection Palette window after loading a session file. A session file describes the projects available for portfolios, the attributes they are characterized by, the manner in which the palettes represent the project information, and the goals (or metrics) that the portfolio is hoped to satisfy. In this example, there are 20 available projects, the palettes are arranged as in FIG. 1-4, and the goals are as shown in FIG. 1-3. After loading a session file, the screen shows all three windows in FIGS. 1-2, 1-3 and 1-4.

FIG. 1-3 displays a Goals alignment window in Project Palette Tool just after a session file has been loaded. Each goal is represented by a bar whose height is the value of the corresponding metric for the present portfolio. The horizontal lines indicate the threshold value for metric acceptability. For upper bounds, the goal is indicated by a line descending from the threshold bar ("Exp 2000 (M$)" goal). For lost bounds, the goal is indicated by a line ascending from the threshold bar ("NPC (M$)" goal). For range goals, in which acceptable metric values are between an upper and lower bound, the acceptable range is indicated by range markers (four rightmost goals). Since the portfolio is presently empty, all metric values are zero. The goals here are Expenses in year 2000, Resource Intensity (a measure of all resources required), net present value (NPV), and the percent allocation of resource intensity to the four types of projects (novel, line extensions, repositionings and marketing). The goals and the project attributes they correspond to are totally user-specifiable.

FIG. 1-4 displays a Legend for bubble plots shown in Selection Palette window. In this example, four project attributes are shown in the plot: (i) Resource intensity for the bubble x-location, (ii) NPV for the bubble y-location, (iii) Project type for the bubble color, (iv) Project division for the bubble shape. In general, any project attribute can be associated with any of six bubble attributes: x-location, y-location, horizontal size of the bubble, vertical size of the bubble, color and shape. Project attributes can be real numbers, integers, dates, and categorical variables (a categorical variable might have several textual values such as "high," "medium" and "low"). The bubble plot accommodates variables of any sort for various bubble properties. When the properties of a bubble plot are changed, the legend updates immediately.

FIG. 1-5 displays a Selection palette window after six projects have been made active. Double-clicking on an available project's bubble moves it to the current (or active) projects bubble plot. Similarly, double-clicking on an active project's bubble moves it to the available projects bubble plot. The controls on the button of the selection palette window allow toggling whether project names are displayed (adjacent to their corresponding bubbles) and the x and y sizing of the bubbles.

FIG. 1-6 shows a Goals alignment window after the 6 projects have been active. The colors of the bars indicate whether the metrics satisfy their goals: red for an unmet goal, yellow for a goal within the slack region of marginal acceptability, and green for a met goal. Right-clinking on a bar shows the goal value, the high and low slack range, and the present metric value.

FIG. 1-7 displays a Goals alignment window for a different set of goals. In the present version of Project Palette, metrics are either the sum of a particular attribute for all active projects or the percentage of this type of sum amongst the different categories of a categorical variable. Goals are having metrics exceed a lower bound, be below an upper bound, or be within a specified range. The general Project Palette include such metrics as the average, maximum and minimum of a specified attribute for active projects.

FIG. 1-8 displays a Project Palette in which one of the two bubble plots has been changed to tabular form. The projects can be selected and transferred to the other palette just as with the bubble plots. Either or both palettes can be shown in tabular form.

FIG. 1-9 displays a Portfolio detail window, showing the active projects, metric values, and goal satisfactions for the present portfolio in the Project Palette.

FIG. 1-10 displays a Bubble plot parameters window—allowing the user to specify which project attribute is associated with what bubble plot characteristic.

FIG. 1-11 displays a Pull-down menu on bubble plot parameters window, showing the various project attributes available for associating with bubble plot characteristics.

FIG. 1-12 displays a different association of project attributes with bubble plot characteristics, showing variation in bubble size with an attribute as well as a categorical variable (quarterly dates) on the x axis.

FIG. 1-13 displays a Context menu displayed when right-clicking on a bubble or element of a tabular list of projects. All attributes are visible in a user-configurable hierarchic menu. This context menu allows for instant access to project data.

FIG. 1-14 displays a Missing values parameters window. Project Palette represents missing data in bubble plots by the use of default colors, shapes and bubble sizes. Here, a neutral gray is used as the bubble color for projects missing the data assigned to bubble color. This window allows the user to specify the color, shape, and horizontal and vertical size for bubbles with missing data. When the data used to set a bubble's x or y location is missing, the bubble is not displayed and a list of omitted projects shown to the user.

FIG. 1-15 displays a Set goals window. The threshold and slack ranges for each goal can be changed while using Project Palette. The heights and colors and the bars in the goals alignment window are instantly updated to reflect the new goals.

FIG. 1-16 displays a set bubble plot parameters window which uses red text to immediately alert the user that the specified attribute is missing for at least one project.

FIG. 1-17 displays a bubble plot legend that is updated to indicate that particular bubble characteristics, here color and shape, are associated with attributes missing for at least one project. The color and shape are instantly updated when the missing values parameters window (1-14) is changed.

FIG. 1-18 displays a Bubble plot with missing values displayed as gray crosses.

FIG. 1-19 displays an example of the user of Project Palette for visual data mining, in which the spatial and temporal arrangements of visual elements reveal patterns and relationships in the data. In this example, no understanding of the domain is required for noting a potentially important relationship in the data. The 7-dimensional bubble plots (in which a bubble can have a fill texture) in Project Palette, combined with the ability to rapidly change how the data is displayed, is intended to allow for easy visual discovery of such relationships.

FIG. 1-20 displays a screen shot from Portfolio Sherpa, showing the Project Palette tool. The two bubble plots show available projects and those in the portfolio currently under consideration. Bubble position, size, shape and color are set as shown in the legend. The Goals Alignment window shows a variety of metrics specified for this Sherpa session, with the colors, bar heights, lines and bars indicating desired an actual metric values for this portfolio.

FIG. 1-21 displays a screen shot of a possible variant of the project palette tool, in which the uncertainty associated with the underlying project variables is folded into probability distributions calculated for the portfolio metrics. In this variant, the mane, width and skew of metric distributions are shown by widening and narrowing the bars that represents the metrics. A bar is widest at the mean and extends up and down until, for instance, one standard deviation distance from the mean. For asymmetric distributions, the bars would extend different distances above and below the man. The color coding can be based either on how the mean compares to the goal and its slack range or by how much of the distribution meets the goal.

III 'In 'n Out" Qualitative Ranking Tool

The "In 'n Out" Qualitative Ranking Tool is intended to allow an individual or a group to quickly rank a large number of projects and separate them into accept, consider, and reject groups. The tool includes two components. The Rank Entry tool allows individuals or select from a list of projects a specified number that they definitely think should be performed (accepted) and a specified number that they definitely think should not be performed (rejected). The Rank Analysis tool collates the accept and reject data from any number of participants and allows individuals or a group to rank, sort and split the projects into different groups in a variety of ways. The chief advantage of the In 'n Out tool over more quantitative ranking tools is that it provides a quick and painless means for removing a large number of projects for future consideration. This technique can considerably lessen the time required for project portfolio management. For example, amongst 200 projects, 50 might be collated into the accept group and 50 into the reject group. Only the remaining 100 need be considered in more, possibly very quantitative, detail.

FIG. 2-1 shows a User job type entry window (Rank Entry tool). When the In 'n Out tool starts, it optionally can request the user to specify his/her job classification. This data can be used in the analysis tool to observe whether there is a systematic relationship between responses on projects and type of job.

FIG. 2-2 shows a Project ranking window (Rank Entry tool). The ranking window allows a user to select projects for acceptance or rejection. The tool can be set to require a specified number of projects to accept and reject, to impose a maximum number of projects to accept and reject, or to allow any number of projects to be accepted or rejected. In the initial view, all projects are in the available list. In this example, each participant is asked to select exactly four projects to accept and four projects to reject.

FIG. 2-3 shows a Project ranking window after projects have been accepted and rejected (Rank Entry tool). Clicking a red or green arrow button moves the currently selected project between the corresponding lists.

FIG. 2-4. Right-clicking on a project in both components of the In 'n Out tool brings up a hierarchic menu showing the properties of the selected project as displayed in FIG. 2-4.

FIG. 2-5 shows an Initial rankings analysis window, which is displayed when starting the Rank Analysis tool. The merged rankings window allows users to perform qualitative and semi-quantitative analyses to rapidly decide which projects to accept and which to reject. Accept/reject data from all participants is loaded and collated by the analysis tool. Additionally, any other information on projects is loaded and available for the analysis The "rank by" control allows users to rank projects by # acceptances (total number of participants who voted in favor of keeping the projects), reverse # rejections, # acceptance minus # rejections, the percentage of acceptances, and by any of the other data loaded. The thresholds controls specify criteria for splitting the projects into three groups: keep, decide and drop. The upper threshold specifies the differences between the keep and decide groups, and the lower threshold sets that for the decide and reject groups. The criteria are # acceptance, # rejections, # acceptance—# rejections, percent acceptances, # projects, and the loaded data (FIG. 2-6). The loaded data can be used to set an absolute threshold; for example, drop all projects whose probability of success is below 0.2. The loaded data can also be used to set cumulative thresholds; for example, keep those projects whose cumulative expenses in year 2000 are less than 2 million dollars, when summing expenses in the order of the present ranking. Projects can also be sorted manually by use of the back, red, green and blue arrows on the right of the window. The black arrows move rank projects within a category, and the colored arrows transfer projects between categories. As shown in this figure, the default view is ranking projects by % acceptances and having no thresholds.

The plot shows the present ranking criteria as a function of the present ranking of projects. As projects are moved into the keep and drop categories, the plot is given green and red background colors to indicate the extent of the different categories (FIGS. 2-6 and 2-7).

FIG. 2-6 shows a Ranking analysis window with ranking set by net present value (NPV) and an upper threshold determined by the % acceptances. The pull-down menu demonstrates the wide variety of criteria that can be used for setting thresholds.

FIG. 2-7 shows a Ranking analysis window with ranking set by % acceptance and an upper threshold set by cumulative resource intensity. In this manner, the user can use relative approval to bias the portfolio in favor of desired projects and then use a hard financial constraint to specify the number of projects. Additionally, a lower threshold of technical success probability being at least 0.2 has removed some projects from consideration. The green and red colors in the plot show the extent of the keep and drop categories. In a group decision-making setting, if the group generally agreed to the rankings and thresholds, further and more detailed discussion can be confined to the decide category. This figure also demonstrates the hierarchic context-sensitive menus that provide all ranking and external data on the projects when right-clicking on a project name.

IV The Portfolio Sherpa

A Multiobjective Portfolio Analysis and Optimization Tool

1. Outline

The Portfolio Sherpa is a highly visual collaborative analysis and optimization framework for project portfolio management. It integrates "what if" analysis, visual data mining, tradeoff analysis, constraint analysis, and multiobjective optimization in a networked suite of tools that help answer the question: "Given my resources, corporate strategy and measures of risk and reward for a pool of existing and potential projects, which should I fund?" Depending on how a company wishes us to custom develop the tool, the Sherpa can also be used to ask which of several variants of a project should be funded, in which each variant has a different risk/reward profile. Project information includes both the present state of the project and probabilistic projections into the future, allowing for time-based considerations of portfolio performance.

The tools and visual representations are highly interactive and are designed for rapid interpretation by executives, project managers and portfolio managers. The network component allows Web browser-based access to the required portfolio data and for distributed portfolio management session, allowing groups of people in different locations to interact on the same management problem. The Portfolio Sherpa can be used to examine an individual portfolio in detail, compare potential portfolios, generate and compare variants of existing portfolios, or find portfolios on efficient frontiers with respect to a large variety of criteria. Interacting with the plots allow users to rapidly generate and test hypotheses. When considering portfolios that result from an efficient frontier analysis, the Sherpa's tradeoff and constraint analysis tools allow for iterative refinement of tentative constraints so as to assist users in honing the decision down to a small number of candidate portfolios. The end result of a Sherpa session is one or a few portfolios that perform as well as possible on a variety of user-specified criteria. The name "Sherpa" is used to evoke the sense of a guide on the Himalayas, providing direction and following requests while searching for points of high elevation (portfolios of high fitness in a fitness landscape.)

2. User Experience Scenarios

The Portfolio Sherpa can by used by at least three arrangements of users.

A single user interacts with the Sherpa on a single computer. The Sherpa can access the appropriate company databases from any location with Internet access.

A group of users interacts with the Sherpa on a single computer. One individual controls the software and all users view the results on a large screen by projection. Results from group Sherpa sessions can be stored for individual analysis, and results from individual sessions can be restored for display to all participants.

Several groups of users at spatially distributed locations interact with one Sherpa session. All groups see the same information displayed simultaneously. One individual controls the software, and control can be passed to any of the users in any of the groups or handled by a facilitator. Results from a design session can be stored locally for extensive review and analysis.

An exemplary single group session might go as follows:

There are 25 projects in various stages of completion and 35 new projects to consider. The Portfolio Sherpa is started and accesses the data defining these 60 projects, their attributes, and the initial set of metrics or objective functions for use in portfolio evaluation. Thirty executives, project managers and portfolio management experts are gathered about a large screen projection of the Sherpa, one of who has volunteered to control the software. Participants have been given preparatory materials reviewing the 60 projects and defining the metrics that have been used to evaluate portfolios in the past. Participants are also prepared with data on available funds and resources of relevance to the metrics, possibly including a pre-defined corporate strategy.

After a preliminary discussion to ensure that all participants are familiar with the projects, available resources and other related issues, the group might first discuss whether the metrics currently engaged in the Sherpa are those they wish to consider as well as whether the constraints on these metrics are appropriately set. Metrics can be added or removed and their constraints changed if necessary.

As a first analysis task, the group might use the bubble plots in the project palette module to assess the metrics for those projects currently underway. If any resource limitations are exceeded, it is clear that the group need remove some existing projects in addition to potentially add new ones. More generally, since the existing projects have progressed since the last portfolio review, the Sherpa displays will make apparent where the portfolio no longer is in balance, where project requirements have become unusually large, where success probabilities are unusually small, and where there exist opportunities for additional projects. Available resources, if any, are noted by gaps between capacity metrics constraints and the metrics for the present portfolio.

At this point, there are two paths the group might take. In the first path, the project palette module is used as a "what if" tool. Projects are added and removed from the portfolio, and the Sherpa instantly shows the corresponding metric values. By use of color-coding and other visual cues, the tradeoffs inherent in the pool of available projects start to become apparent. By changing how information is represented in the bubble plots and viewing the costs and project stages over time, the group can start eliminating projects that overly represent a given therapeutic area or concentrate too many expenses in too short a period. By an iterative process of project elimination and refinement of the constraints on the metrics, the group can gradually progress towards a candidate set of portfolios.

The second path, using the optimization module of the Sherpa, is a more realistic starting point when there are many projects or rigid constraints to consider. The optimizer allows specifying which metrics should be made as large or small as possible as well as bounds on other metrics. For example, the task may be to find portfolios that maximize NPV, minimize resource intensity, and require that between 60 and 80 percent of the costs in the next year come from the "new chemical entity" category. The optimizer will then return a number of portfolios on the relevant efficient frontier. Since the efficient frontier may be with respect to several metrics, it is possible that the efficient frontier consists of hundreds to thousands of portfolios. Alternatively, there may be no portfolios that satisfy the constraints, in which case the optimizer will report having found no solutions. If no solutions are found, the group can soften some of the constraints and re-invoke the optimizer. If too many solutions are found, the optimizer can be re-invoked with harder constraints.

Once a number of portfolios on the efficient frontier are found, they can be examined collectively using scatterplots, bubble plots, parallel coordinate plots or tabular lists of portfolio characteristics. In this process, the group will start eliminating portfolios from the set and refine the requirements for the final portfolio. The group may discover that portfolios should be examined with respect to different efficient frontiers, in which case it can engage the optimizer again but retain constraints learned from the analysis so far. When the list of portfolios surviving this analysis is sufficiently small, portfolios can be examined individually using bubble plots, tabular lists, and plots comparing actual to desired metric values. The few portfolios that seem reasonable candidates can be examined in detail using the project palette tool, in which portfolios can be refined and tweaked. This is an opportunity to consider issues that are not well represented in quantitative form. If there remains more than one portfolio at this point, the Sherpa can display several portfolios at once using any of its visualization tools, allowing display of all differences between the candidates and for a final group decision.

3. Data Referenced by Portfolio Sherpa

The Portfolio Sherpa uses data on projects, their attributes, the raw values underlying these attributes, and the objective functions used to evaluate portfolios.

Project data consists of the names and textual descriptions of the projects, both in long and short forms to accommodate user needs at different points in tool usage.

Project attributes are the properties with which the Sherpa and the users evaluate individual projects. Typical examples are net present value (NPV), number of developers required, probability of success, expected date of completion, etc. These properties can be of deterministic or probabilistic, with several probability distributions available. The Sherpa references the names, units and ranges of the attributes and the type of distribution used. For categorical attributes, in which the different values are textual phrases such as "high" and "low," the Sherpa also references long and short versions of the names of the categories.

Raw values are the actual values for attributes, including the appropriate parameters for those described with distributes (typically a mean and variance or a high and low value for a range). The Portfolio Sherpa is able to gracefully handle missing data.

The objective functions are the properties used to rate portfolios as a whole. Some are simply sums or averages of an attribute for all projects in the portfolio. Others are the percentage of a numeric attribute for projects of a given type; for example, the percentage of development costs in year 2000 that are for "new chemical entities" (vs. line extensions). These and a large variety of other portfolio metrics can be loaded by the Sherpa initially, though other objectives can be created in the course of tool use.

4. Operations Performed

The Portfolio Sherpa can perform a large variety of activities for group decision-making, tradeoff analysis, constraint analysis, portfolio optimization, "what if" analysis, and visual data mining. The general type of operations include:

Generating Portfolios:
- Manually by specifying which projects are performed
- Manually by modifying an existing portfolio
- By software randomly generating a portfolio
- By software generating portfolios via "mutating" an existing portfolio
- By loading a portfolio from disk
- By use of the project palette tool
- By use of the multiobjective optimizer Visualizing Information
- Tabular list of projects with textual coloring per rules applied to project attributes (Both for all potential projects and for projects within a specified portfolio)
- A variety of iconic representations of portfolios (ex: mini bubble plots, bar graphs, spider plots, etc.)
- 1-D histograms
- 2-D histograms
- 2-D scatterplots
- 2-D bubble plots
- 2-D bubble plots in the project palette setting
- Time-based 2-D bubble plots (either multiple bubble plots are shown, each corresponding to a different time; or one bubble plot is shown with a control to allow moving forward or backwards in time. As time changes, bubble characteristics change to reflect changing project status and attributes.)
- 3-D bubble plots (optional)
- 3-D scatterplots (optional)
- Parallel coordinate plots (optional)

Note: All visualizations can be applied to the results of recent operations, portfolios selected that meet certain criteria, or to all portfolios in memory. All plots have context-sensitive menus that give immediate access to project information with no disruption to the viewing the plot. Most plots have "brushing" capability, allowing information selected in one plot to highlight corresponding information in other plots shown simultaneously. Most plots will allow highlighting those points corresponding to points on the efficient frontiers with respect to any combination of objectives. All plots will have a "find" function to allow quickly identifying the point or bar corresponding to a given project. Most plots will also allow for constraint analysis by allowing interactive specification of portfolio and project constraints. As the constraints are changed, points and bars in the plots change, disappear or appear.

Multiojective Optimization
- Ability to specify which of any combination of project and/or portfolio criteria are to be used as the objectives to be maximized or minimized, which are to be used as constraints, and which are to be ignored. Constraints may be of the form of lower bounds, upper bounds or ranges.
- Ability to rank the constraints in order of importance (of use for when no feasible solutions are found and the software needs to recommend which constraints to weaken first so as to find feasible solutions.
- Ability to specify how densely to sample the relevant efficient frontiers
- Ability to define new metrics by simple combinations of existing metrics (ex: maximum, minimum, average, number of, sum, weighted sum, etc. of project attributes or portfolio metrics)
- Ability to control optimization algorithm parameters Data Manipulation
- Ability to remove portfolios from the set in memory by various criteria:
  - Removing user-selected portfolios
  - Removing portfolios that do not meet a specified upper bound, lower bound or range criteria for an objective
  - Removing portfolios that do not meet specified criteria for the inclusion or removal of projects
  - Removing portfolios that are not on specified efficient frontiers
- Ability to sort a set of portfolios by any objective
- Ability to merge data from concurrent Sherpa sessions
- Ability to split data from one Sherpa session into two sessions
- Ability to edit project attribute data
- Ability to run concurrent sessions of the Sherpa, each with the same abilities but with different portfolios or metrics under consideration Strategy Related Data Manipulation
- Define a strategy
  - Using an objective as a strategic measure
  - Using a categorical objectives to define strategic buckets (a "strategic bucket" is a category of projects to which specific funds can be allocated)
  - Using dates to define strategic buckets
- Define a metric reflecting the degree to which portfolios match the defined strategy
  - The user can apply weights to the different strategic measures so as to rank their relative importance
- Edit a strategy during session use and instantly re-compute strategic match
- Find strategies that best take advantage of existing projects—given constraints
- Find characteristics of projects that, when combined with the present projects, best match the given strategy—given constraints Input and Output
- Load and save individual portfolios
- Load and save groups of portfolios
- Load and save entire Sherpa sessions
- Load and save plot configuration parameters
- Load and save constraints/metrics/design goals
- Load and save user-defined metrics
- Save single or multiple portfolios in a report format specified by Lilly Network Capability
- Central database to store and distribute all information.
- Ability to port project data from a company's present Browser
- Consideration of future knowledge management issues at a company
  - Goal is to prevent potential incompatibilities with future knowledge management needs and to allow graceful extensions to software
- One individual has control over the software
  - Control can be passed between individuals.
  - Can have a moderator pass control or have each individual pass control to the next person.
- All participants see the same set of views as on the controller's screen
  - A pop-up window shows who is participating in the group session
- Users can run the application individually and store plots, data and configurations for use m a group session.

5. Extensions and Options

Project variants: In this extension, projects can be implemented in several variants, each with different risk/reward attributes. The Portfolio Sherpa allows users to not only specify that a project is being performed but to specify which variant of it is being considered. The optimizer will search over all combinations of projects and all variants of each project.

Constraints between projects: The Portfolio Sherpa enables the user to specify that certain projects must or cannot be performed unless other projects are also performed. For example, project E-21 may require that E-20 be performed simultaneously, while E-20 can be performed on its own. Constraints may also be extended to project variants, in which certain variants are possible only if other projects or project variants are performed. The Portfolio Sherpa enforces these constraints at all points during interactive use, and the optimizer also enforces these constraints.

Bayesian Networks: Many projects have more complex relationships between them than can be expressed in the simple constraints described above. For example, if two projects share the same resources, their resource costs are not the simply the sum of the resources of each project individually. If two projects are in the same field, the probability of completing one can be conditionally dependent on the other's successfully reaching a given stage of completion. Such a complex web of deterministic and probabilistic relationships is represented and analyzed with a Bayesian network. The Portfolio Sherpa allows users to define these relationships in a textual or graphical manner and then use these relationships in calculating portfolio properties.

Interface with Excel: The Portfolio Sherpa can load and store data in Microsoft Excel format.

6. Interface

The Portfolio Sherpa is a version of the Configuration Sherpa geared specifically to project portfolio management problems. The Configuration Sherpa is a tool for product and strategy design involving iterative application of multiobjective optimization, extensive visualization tools, visual data mining, evolutionary algorithms, and "what if" analysis. The Configuration Sherpa is further described in U.S. patent application Ser. No. 09/345,441, titled, "An Adaptive and Reliable System and Method for Operations management", filed, Jul. 1, 1999, the contents of which are herein incorporate by reference. The portfolio management problem includes deciding which of a given set of projects should be implemented so as to maximize certain criteria, minimize other criteria, and keep a number of other criteria within specified ranges. In the preferred embodiment, the project resources are fixed, so the only choice is whether or not to perform a project. The Portfolio Sherpa brings all the capabilities of the Configuration Sherpa to bear on this problem and is particularly relevant when the projects are well-characterized with a variety of quantitative attributes.

FIG. 3-1 displays an Active portfolios window that is shown upon starting the Sherpa. The text on the left indicates the metrics to be used as objectives or constraints in the design session. In this example, the metrics are expenses in year 2000, resource intensity, net present value, and the percent of the resource intensity allocated to four different categories of projects—novel, line extensions, repositionings and marketing.

FIG. 3-2 displays a Portfolio edit window. As the projects are added or removed from the portfolio, the metrics are immediately updated. Once this portfolio is accepted, it is stored in memory and placed on the active portfolios window.

FIG. 3-3 displays a Set goals window. Much as in FIG. 1-15, users can specify the threshold and slack ranges for goals. The nature of the goals can be changed by clicking on the relationship operator button (<. =, >). Goals can be turned on and off by use of the checkboxes on the left. As soon as goals are updated, all other figures on the screen are updated accordingly.

FIG. 3-4 shows one portfolio in iconic format on the active portfolios screen. As portfolios are generated, they are added to the list in memory and onto the active portfolios screen. This iconic representation uses a series of bars to indicate the values of the goals. The goal bars are in the same order as listed on the left of the window. The black vertical lines show the goal threshold value, and the black horizontal lines show the extent of the slack range. The bars are colored according to whether they meet or fail the goal or are in its slack range. The rectangle bordering the icon is colored red if any goals are missed, yellow if no goals are missed but at least one is in the slack range, and green otherwise. The text beneath a portfolio icon indicates its number and manner of generation.

FIG. 3-5 shows a Display of portfolio details once goals have been set. The portfolio evaluation is colored in the same manner as the bars in the portfolio icons. This same coloring occurs when manually designing a portfolio (FIG. 3-2) after goals have been specified.

FIG. 3-6 shows an Active portfolios window once a large population of portfolios have been generated. In this example, the portfolios are designed by randomly deciding which projects are performed.

FIG. 3-7 shows an Active portfolios window after changing the number of icons that can be displayed. In an alternate embodiment, Sherpa has a variety of icons for portfolios that can be switched between during a session.

FIG. 3-8 shows an Optimization constraints window. Since portfolio optimization requires designing portfolios that perform well in a number of criteria, portfolio optimization is best done with multiobjective optimization methods. Here, goals can be used as objectives for maximization or minimization or as constraints—in any combination.

FIG. 3-9 shows 2-D scatterplot controls. This window allows specifying what data is plotted against what other data in a 2-D scatterplot. It also allows specifying what efficient frontier should be estimated from the data and displayed in the plot. Clicking on "Pick point" allows the user to select an individual point from the plot for detailed analysis.

FIG. 3-10 shows a 2-D scatterplot generated by the controls in FIG. 3-9. The green points are the portfolio sin memory, the pink star is the presently-selected point, the black line shows the efficient frontier with respect to expenses in year 2000 and net present value, and the green and red lines indicate the slack range for the corresponding variables, with green being the acceptable side.

FIG. 3-11 shows a 2-D scatterplot when the requested efficient frontier is not the same as the two axes in the plot. In this case, small circles around all its members represent the frontier.

FIG. 3-12 shows 2-D subset scatterplot controls. This window contains all the functionality of FIG. 3-9 but additionally allows the user to specify constraints that affect the plot. Projects can be required or definitively rejected by clocking the buttons next to the project names. Using the sliders or number fields on the right of the screen specifies requirements on the metrics. The checkboxes next to the metrics allow for rapidly using and disengaging constraints.

FIG. 3-13 shows a 2-D subset scatterplot. The plot and representation of the efficient frontier is similar to that in FIGS. 3-10 and 3-11; however, points are colored green if they meet the constraints specified in FIG. 3-12 and are colored red otherwise. Additionally, the efficient frontier is calculated only with respect to the points that meet the constraints. In this fashion, users can perform constraint analysis and see the impact of constraints on the optimal tradeoffs. The buttons on the bottom left turn parts of the plot on and off.

FIG. 3-14 shows a 2-D subset scatterplot that omits the points that do not meet the constraints.

FIG. 3-15 demonstrates the ability to zoom in on "rubberband" selected portions of a 2-D subset scatterplot.

FIG. 3-16 shows a screen shot from Portfolio Sherpa that shows an iconic representation of a pool of potential portfolios in memory, the details on one portfolio, an interface for specifying strategic goals, and a tradeoff plot between portfolio NPV and strategic alignment. The points highlighted with circles are on the efficient frontier with respect to NPV and strategic alignment, while the lines show user-specified requirements. In this case, there exist several good choices that both satisfy the requirements and are on the efficient frontier.

FIG. 3-17 shows assorted windows from Portfolio Sherpa. (a) A typical portfolio detail window, showing the projects included in a portfolio, its metrics, and whether the metrics are within the ranges specified by the user; (b) The optimization constraints window, in which users specify which metrics to maximize, which to minimize, and which to use as what type of constraint; (c) A scatterplot showing the efficient frontier with respect to NPV and resource intensity, subject of the constraint that expenses in year 2000 do not exceed a specified threshold. Points can be colored differently to distinguish portfolios that meet the constraint from those that do not meet the constraint. The line shows the efficient frontier.

V Electronic Scorecard Tool

The Electronic Scorecard Tool allows a group to rank and choose amongst potential projects. The scorecard entry tool allows any number of participants to characterize projects by responses to multiple-choice questions. The scorecard analysis tool collates the scorecard responses and merges them with data collected elsewhere, then allows an individual or group to rank the projects and choose which to implement. The tool provides a semi-quantitative means to perform project portfolio management and is especially appropriate for circumstances where quantitative models for the risks and rewards of implementing the projects are unavailable or too expensive to develop.

FIG. 4-1 shows a User job type entry window. When the Electronic Scorecard tool starts, it optionally can request the user to specify his/her job classification. This data can be used in the analysis tool to observe whether there is a systematic relationship between responses on projects and type of job.

FIG. 4-2 shows an Initial data entry screen of scorecard entry tool. Users are presented with a number of projects (or service offerings, tasks, objectives, etc.) and a number of multiple-choice questions to characterize the projects with. Clicking on the button for a project changes the summary to that for the selected project and changes the question responses to those presently chosen for that project. Initially, all project buttons are red, indicating that no questions have been answered for those projects. In one embodiment, there is only one screen showing all the questions and all the projects. In the preferred embodiment version, there can be multiple pages of projects and multiple pages of questions for a given project.

FIG. 4-3 shows a Data entry screen for scorecard entry tool after all questions have been answered for the first three projects and some questions have been answered for the fourth project. The coloring of the project buttons alerts the user to which projects still require his/her attention (green→all questions answered for that project, yellow→some questions unanswered for that project, red→no questions answered for that project).

FIG. 4-4 shows a Survey summary in scorecard analysis tool. This window displays basic properties of the survey, including percentage participants of each job classification and the range of number of responses to individual questions. As for all windows described below, this window is accessed through a floating menubar that is displayed when the scorecard analysis tool is started.

FIG. 4-5 shows a Response grid window in scorecard analysis tool. This window shows an array of projects on the left and scorecard questions on the top. Each intersection gives information about the collated responses to a question for a project. By use of the pull-down menu on the bottom right, information can be displayed by color scale (as shown), by text (FIG. 4-6), or by both (FIG. 4-7). By use of the pull-down menu on the bottom left of the window, the type of information shown in each intersection can be changed. Colors reflect the number of responses to each project/question combination. A light color for question 4 indicates that that question received significantly fewer responses than the other questions.

FIG. 4-6 shows a Response grid showing the normalized mean response to questions. A normalized mean response to a multiple-choice question is calculated by associating the "worst" response for a project (generally response "b", since an "as' is a "don't know" response) with the value 0 and the best response with the value 1. In this fashion, a numeric version of a response can be interpreted needing to know the number of different multiple-choice responses for a question. In contrast, the raw mean response uses a different integer for each letter answer ("a"=1, "b"=2, etc.), and cannot be interpreted without knowing the number of responses for a question.

In this example, the rectangles show the multiple-choice letters used in the questions. In an alternate embodiment, the normalized responses are shown instead. The top row shows the average response over all projects for each question, and the leftmost column shows the average response over all questions for each project. In an alternate embodiment, instead of this average response, the scorecard analysis tool displays a normalized response that is weighted by the number of responses to each project/question combination. This calculation lessens the degree to which outlier responses (e.g. only one person responding to a particular project/question) invalidates the FIG. 4-7 displays a Response grid showing the normalized standard deviation of responses to each project/question. Large standard deviations indicate disagreement amongst the participants about the meaning of the question, the definition of the project, or other information used to answer the question. This type of representation allows a group to check the group consensus on the data before moving to more detailed analysis.

FIG. 4-8 shows a histogram of responses to a particular question for a particular project. Right-clicking on any rectangle within the response grid window engages a "drill-down" function that displays the appropriate histogram. In this case, the histogram is of responses to question 3 for the "Infrastructure" project. The histogram shows the percent of responses of each type as well as the raw mean response, raw standard deviation, and number of respondents. A second level of drill-down occurs when right-clicking on any bar in the histogram. Right-clicking shows a temporary window showing the percent of respondents by job category for that response.

When the histogram in FIG. 4-8 is shown, another window shown in FIG. 4-9 is displayed giving the legend for the relevant question. These legends are also obtainable directly from the main menu.

FIG. 4-10 shows Initial rank and sort grid. The rank and sort grid is the main decision-making tool in the Electronic Scorecard analysis tool. The leftmost column shows the projects, and the remaining columns show whatever data is available for the projects (both survey data and externally generated data). The user can set the number of columns of data shown according to his screen's resolution. The pull-down menus at the top of a column sets what type of data is shown in the column. The arrows on the right allow for manual sorting of the projects according to individual or group preference.

FIG. 4-11 shows the sort menu item on the rank and sort grid which allows sorting the projects according to any of the type of data loaded for the projects.

FIG. 4-12 shows a Set goals window. With this window, users can specify requirements for the projects they wish to perform. Checkboxes activate the corresponding constraint. Clicking on the ">" sign cycles between lower bound constraints, upper bound constraints, and range constraints. Aside from a threshold value, the goals can have slack ranges as specified in the rightmost columns.

FIG. 4-13 shows a Rank and sort grid after setting goals from growth rate, market size and percent qualified technicians and engineers. Each rectangle is colored red according to whether the corresponding metric is achieved for the corresponding project (red→metric fails to meet the goal, yellow→metric within slack range of goal, green→metric meets the goal). Yellow is used when a datum is unknown. These colors are updated instantly when the goals are changed on the set goals window.

The names of the projects themselves are colored according to whether they meet all the required goals. If any column is red for a project, the project name is colored yellow. If no goals are missed but there is at least one yellow entry for that project, the project is colored yellow. Otherwise, the project is colored green. In this manner, it can be told instantly which if any projects meet the requirements specified in the goals window.

If the goals are too restrictive, no projects are green. If the goals are too permissive, no projects are red or yellow. In either case, the goals are not set in a fashion that lends itself to deciding between the projects. By iterative refinement of the goals and viewing which projects survive the goal criteria, users can find goals that are neither too harsh nor too permissive and allow selecting one or a small number of projects to perform—one of the chief ways this tool can be used.

FIG. 4-14 shows a Bubble plot linked to the scorecard analysis tool. Clicking a button on the rank and sort window puts up this plot. The bubble colors are the same as those for each project name (FIG. 4-13). The other dimensions of the bubble plot can be set to any of the project attribute variables with the bubble plot parameters window (FIG. 4-15). much as in the Project Palette Tool described above.

FIG. 4-15 shows a Bubble plot parameters window. Red text indicates that the highlighted project attribute is not known for all projects. "Goal satisfaction" indicates that the bubbles will be colored according to their meeting the user-specified goals.

FIG. 4-16 shows a Response histogram controls window. This window allows users to request histograms of responses for a specified project and question. The resulting histogram is identical to that generated by a drill-down operation on the response grid window (FIG. 4-8).

FIG. 4-17 shows a Set user question weights window. The scorecard analysis tool allows users to define their own metrics as linear combinations of the scorecard responses. Users specify the relative weight to give each of the questions, and the tool use the weighted sum as a new project property for use in all operations described above. A more advanced version of this tool would allow for similar metrics to be defined using both the scorecard questions and the external data.

VI Representative Computer System for Implementing the Invention

FIG. 5 discloses a representative computer system 510 in conjunction with which the embodiments of the present invention may be implemented. Computer system 510 may be a personal computer, workstation, or a larger system such as a minicomputer. However, one skilled in the art of computer systems will understand that the present invention is not limited to a particular class or model of computer.

As shown in FIG. 5, representative computer system 510 includes a central processing unit (CPU) 512, a memory unit 514, one or more storage devices 516, an input device 518, an output device 520, and communication interface 522. A system bus 524 is provided for communications between these elements. Computer system 510 may additionally function through use of an operating system such as Windows, DOS, or UNIX. However, one skilled in the art of computer systems will understand that the present invention is not limited to a particular configuration or operating system.

Storage devices 516 may illustratively include one or more floppy or hard disk drives, CD-ROMs, DVDs, or tapes. Input device 518 comprises a keyboard, mouse, microphone, or other similar device. Output device 510 is a computer monitor or any other known computer output device. Communication interface 522 may be a modem, a network interface, or other connection to external electronic devices, such as a serial or parallel port While the above invention has been described with reference to certain preferred embodiments, the scope of the present invention is not limited to these embodiments. One skilled in the art may find variations of these preferred embodiments which, nevertheless, fall within the spirit of the present invention, whose scope is defined by the claims set forth below.

What is claimed is:

1. A method for interacting with a computer to manage a portfolio of one or more projects comprising the steps of: providing a computer having a computer-readable media, wherein the computer-readable media has an application stored thereon; storing one or more attributes of the one or more projects on the computer-readable media; executing the application which includes one or more windows having one or more controls; manipulating at least one of said controls to associate one or more plot characteristics with the one or more attributes of the one or more projects; manipulating at least one of said controls to display a plot of said one or more attributes and of said one or more projects in accordance with said plot characteristics; and manipulating at least one of said controls to define one or more goals that the portfolio should satisfy to thereby manage the portfolio of one or more projects.

2. A method for interacting with a computer to manage a portfolio as in claim 1 wherein said attributes of the projects comprise at least one of the following: resource intensity, net present value, project type, project division.

3. A method for interacting with a computer to manage a portfolio as in claim 1 wherein said attributes of the projects comprise at least one of the following: real number, integer, date and categorical variable.

4. A method for interacting with a computer to manage a portfolio as in claim wherein said plot characteristics comprise at least one of the following: x-location, y-location, color, shape, horizontal size, vertical size, and a fill texture.

5. A method for interacting with a computer to manage a portfolio as in claim 1 further comprising the step of: manipulating at least one of said controls to display values of said goals for the portfolio.

6. A method for interacting with a computer to manage a portfolio as in claim 5 wherein the values of said goals are displayed as one or more bars.

7. A method for interacting with a computer to manage a portfolio as in claim 5 wherein each of said values of each of said goals will be displayed in a color to indicate whether the portfolio satisfied said goal.

8. A method for interacting with a computer to manage a portfolio as in claim 7 wherein said value of said goal is green if the portfolio meets said goal and red if the portfolio does not meet said goal.

9. A method for interacting with a computer to manage a portfolio as in claim 1 wherein said goals comprise at least one of the following: expenses for an identified year, resource intensity, net present value, and a percent allocation of resource intensity to one or more types of the projects.

10. A method for interacting with a computer to manage a portfolio as in claim 9 wherein said one or more types of the projects comprise at least one of the following: novel, line extensions, repositioning and marketing.

11. A method for interacting with a computer to manage a portfolio as in claim 1 wherein said goals comprise one or more constraints.

12. A method for interacting with a computer to manage a portfolio as in claim 11 wherein said constraints comprise at least one of the following: upper bound, lower bound, and range.

13. A method for interacting with a computer to manage a portfolio as in claim 11 further comprising the step of: manipulating at least one of said controls to modify at least one of said constraints.

14. A method for interacting with a computer to manage a portfolio as in claim 13 further comprising the step of manipulating at least one of said controls to compare values of said goals with said at least one modified constraint.

15. A method for interacting with a computer to manage a portfolio as in claim 14 further comprising the steps of repeating said manipulating at least one of said controls to modify at least one of said constraints step and said manipulating at least one of said controls to compare values of said goals with said at least one modified constraint step to see at least one effect of said at least one modified constraint on the portfolio.

16. A method for interacting with a computer to manage a portfolio as in claim 1 further comprising the step of manipulating at least one of said controls to modify said selection of said projects to include in the portfolio.

17. A method for interacting with a computer to manage a portfolio as in claim 16 further comprising the step of: manipulating at least one of said controls to display the values of said goals for the modified portfolio for evaluating said projects.

18. A method for interacting with a computer to manage a portfolio as in claim 17 further comprising the step of: repeating said manipulating at least one of said controls to modify said selection of said projects step and said manipulating at least one of said controls to display the values of said goals for said modified portfolio step one or more times to optimize the portfolio and to see at least one tradeoff among said one or more goals.

19. A method for interacting with a computer to manage a portfolio as in claim 1 further comprising the step of: manipulating at least one of said controls to modify said one or more goals that the portfolio should satisfy.

20. A method for interacting with a computer to manage a portfolio as in claim 19 further comprising the step of: manipulating at least one of said controls in said project selection window to display values of said modified goals.

21. A method for interacting with a computer to manage a portfolio as in claim 20 further comprising the step of: repeating said manipulating at least one of said controls to modify said one or more goals step and said manipulating at least one of said controls to display values of said modified goals step one or more times to see at least one effect of said goals on the portfolio.

22. A method for interacting with a computer to manage a portfolio as in claim 1 further comprising the step of: manipulating at least one of said controls to select at least one of the projects and to display data on said attributes of said at least one selected project.

23. A method for interacting with a computer to manage a portfolio as in claim 1 wherein said data on said attributes is displayed in at least one hierarchy.

24. A method for interacting with a computer to manage a portfolio as in claim 1 further comprising the step of: manipulating at least one of said controls to perform visual data mining for at least one of the projects.

25. A method for interacting with a computer to manage one or more portfolios of one or more projects comprising the steps of: providing a computer having a computer-readable media, wherein the computer-readable media has an application stored thereon; executing the application which includes at least one window having one or more controls; manipulating at least one of said controls to specify one or more goals that the one or more portfolios should satisfy to thereby manage the one or more portfolio of one or more projects; and manipulating at least one of said controls to select at least one of said projects to include in said one or more portfolios and to display values of at least one of the goals for said one or more portfolios.

26. A method for interacting with a computer to manage one or more portfolios as in claim 25 wherein said one or more goals comprise at least one of the following: a threshold and slack range.

27. A method for interacting with a computer to manage one or more portfolios as in claim 26 wherein said values of said at least one goal are colored according to whether said value meets said threshold, fails said threshold or falls within said slack range.

28. A method for interacting with a computer to manage one or more portfolios as in claim 26 wherein a border surrounding said values of said at least one goal for said one or more portfolios are colored according to whether at least one of said values fails said threshold, at least one of said values falls within said slack range or all of said values meet said threshold.

29. A method for interacting with a computer to manage one or more portfolios as in claim 25 further comprising the steps of manipulating at least one of said controls to specify one or more objectives; and manipulating at least one of said controls to cause the application to determine said one or more portfolios that are optional with respect to said objectives.

30. A method for interacting with a computer to manage one or more portfolios as in claim 29 wherein said one or more goals are used as said one or more objectives for minimization or maximization.

31. A method for interacting with a computer to manage one or more portfolios as in claim 29 wherein said one or more objectives comprise one or more constraints.

32. A method for interacting with a computer to manage one or more portfolios as in claim 31 further comprising the steps of: manipulating at least one of said controls to select at least one of said objectives to use as dimensions for a plot of said one or more portfolios; manipulating at least one of said controls to cause the application to determine and display said plot for said portfolio wherein said selected objectives are used as said dimensions.

33. A method for interacting with a computer to manage one or more portfolios as in claim 32 further comprising the steps of: manipulating at least one of said controls to select at least one of said objectives for a determination of an efficient frontier; and manipulating at least one of said controls to cause the application to determine and to display a plot of said efficient frontier of said portfolio with respect to said selected objectives.

34. A method for interacting with a computer to manage one or more portfolios as in claim 32 wherein said plot further comprises at least one slack range for at least one of said selected objectives.

35. A method for interacting with a computer to manage one or more portfolios as in claim 32 wherein said plot is a scatterplot.

36. A method for interacting with a computer to manage one or more portfolios as in claim 32 further comprising the steps of: manipulating at least one of said controls to select at least one of said constraints having one or more effects on said plot; and manipulating at least one of said controls to cause the application to determine and display said one or more effects of said selected constraints on said plot.

37. A method for interacting with a computer to manage one or more portfolios as in claim 36 wherein said at least one control to select said at least one constraint comprises at least one of a slider bar and a number field.

38. A method for interacting with a computer to manage one or more portfolios as in claim 36 wherein one or more points representing said one or more portfolios in said plot are colored according to whether said represented portfolio meets said constraints.

* * * * *